(12) United States Patent
Dal Prà et al.

(10) Patent No.: US 10,337,599 B2
(45) Date of Patent: Jul. 2, 2019

(54) SPROCKET MODULE FOR A BICYCLE AND SPROCKET ASSEMBLY COMPRISING SUCH A MODULE

(71) Applicant: CAMPAGNOLO S.R.L., Vicenza (IT)

(72) Inventors: Giuseppe Dal Prà, Zanè (IT); Leopoldo Lazzarin, Vicenza (IT)

(73) Assignee: CAMPAGNOLO S.R.L., Vicenza (IT)

( * ) Notice: Subject to any disclaimer, the term of this patent is extended or adjusted under 35 U.S.C. 154(b) by 571 days.

(21) Appl. No.: 14/314,526

(22) Filed: Jun. 25, 2014

(65) Prior Publication Data

US 2015/0018151 A1    Jan. 15, 2015

Related U.S. Application Data

(63) Continuation of application No. 12/187,643, filed on Aug. 7, 2008, now Pat. No. 8,764,594.

(30) Foreign Application Priority Data

Aug. 9, 2007 (IT) .............................. MI2007A1658

(51) Int. Cl.
   *F16H 55/30*    (2006.01)
   *B62M 9/10*    (2006.01)

(52) U.S. Cl.
   CPC .............. *F16H 55/30* (2013.01); *B62M 9/10* (2013.01)

(58) Field of Classification Search
   CPC . B62M 9/00; B62M 9/04; B62M 9/06; B62M 9/10; B62M 9/105
   See application file for complete search history.

(56) References Cited

U.S. PATENT DOCUMENTS

| | | |
|---|---|---|
| 3,082,637 A | 3/1963 | Paxton |
| 3,919,898 A | 11/1975 | Sugino |
| 4,472,163 A | 9/1984 | Bottini |
| 4,869,710 A | 9/1989 | Iwasaki |
| 5,026,329 A | 6/1991 | Diekevers |
| 5,503,600 A | 4/1996 | Berecz |
| 5,766,106 A | 6/1998 | Edwards |
| 5,935,034 A | 8/1999 | Campagnolo |
| 5,954,604 A | 9/1999 | Nakamura |

(Continued)

FOREIGN PATENT DOCUMENTS

| | | |
|---|---|---|
| DE | 4401272 C1 | 3/1995 |
| DE | 19629602 A1 | 1/1998 |

(Continued)

OTHER PUBLICATIONS

European Search Report—EP 08005991.8-2421.

(Continued)

*Primary Examiner* — Michael R Mansen
*Assistant Examiner* — Juan J Campos, Jr.
(74) *Attorney, Agent, or Firm* — Volpe and Koenig, P.C.

(57) ABSTRACT

A sprocket module for a bicycle has at least two sprockets fixedly coupled one another. At least one first sprocket of the at least two sprockets comprises engagement portion to a freewheel body of a hub for a bicycle rear wheel. A second sprocket of the module lacks the engagement portion and is supported on the freewheel body through the aforementioned at least one first sprocket. The module allows strong and low-weight sprocket assemblies to be made.

16 Claims, 21 Drawing Sheets

(56) References Cited

U.S. PATENT DOCUMENTS

| | | |
|---|---|---|
| 6,039,665 A | 3/2000 | Nakamura |
| 6,102,281 A | 8/2000 | Lafferty et al. |
| 6,102,821 A | 8/2000 | Nakamura |
| 6,176,798 B1 | 1/2001 | Nakamura |
| 6,382,381 B1 | 5/2002 | Okajima et al. |
| 6,428,437 B1 | 8/2002 | Schlanger |
| 7,344,463 B2 | 3/2008 | Reiter |
| 7,854,673 B2 | 12/2010 | Oseto et al. |
| 7,871,347 B2 | 1/2011 | Kamada |
| 7,931,553 B2 | 4/2011 | Tokuyama |
| 8,057,338 B2 | 11/2011 | Kamada |
| 2001/0039224 A1 | 11/2001 | Lim et al. |
| 2004/0121867 A1 | 6/2004 | Reiter |
| 2006/0063624 A1 | 3/2006 | Voss |
| 2006/0231366 A1 | 10/2006 | Meggiolan |
| 2006/0258499 A1 | 11/2006 | Kamada |
| 2007/0129193 A1 | 6/2007 | Nonoshita et al. |
| 2008/0004143 A1* | 1/2008 | Kanehisa .......... B62M 9/10 474/160 |
| 2008/0058144 A1 | 3/2008 | Oseto |
| 2008/0234082 A1 | 9/2008 | Braedt |
| 2009/0042681 A1 | 2/2009 | Dal Pra' et al. |
| 2009/0042682 A1 | 2/2009 | Dal Pra' et al. |
| 2011/0092327 A1 | 4/2011 | Oishi |

FOREIGN PATENT DOCUMENTS

| | | |
|---|---|---|
| DE | 29623258 U1 | 1/1998 |
| DE | 202004019270 U1 | 4/2005 |
| DE | 102007010456 A1 | 12/2007 |
| EP | 0012568 A1 | 6/1980 |
| EP | 0193178 A1 | 9/1986 |
| EP | 0561380 A1 | 9/1993 |
| EP | 0765802 A2 | 4/1997 |
| EP | 1043221 A2 | 10/2000 |
| EP | 1422134 A2 | 5/2004 |
| EP | 1431172 A2 | 6/2004 |
| EP | 1688345 A2 | 8/2006 |
| EP | 1721823 A2 | 11/2006 |
| EP | 2022713 A2 | 2/2009 |
| FR | 910359 A | 6/1946 |
| FR | 989114 A | 9/1951 |
| JP | 56138788 A2 | 10/1981 |
| JP | 59165293 A2 | 9/1984 |
| JP | 3108527 A | 5/1991 |
| JP | 10181669 A2 | 7/1998 |
| TW | 273218 Y | 3/1996 |
| TW | 349892 B | 1/1999 |

OTHER PUBLICATIONS

European Search Report, Appl. No. EP 08005991.8, dated Mar. 6, 2009.

Japanese Office Action for Application No. 2008-205177 dated Jan. 8, 2013 with English Translation.

Taiwanese Office Action and Search Report dated Oct. 29, 2013 in corresponding Taiwanese Application No. 097129110.

* cited by examiner

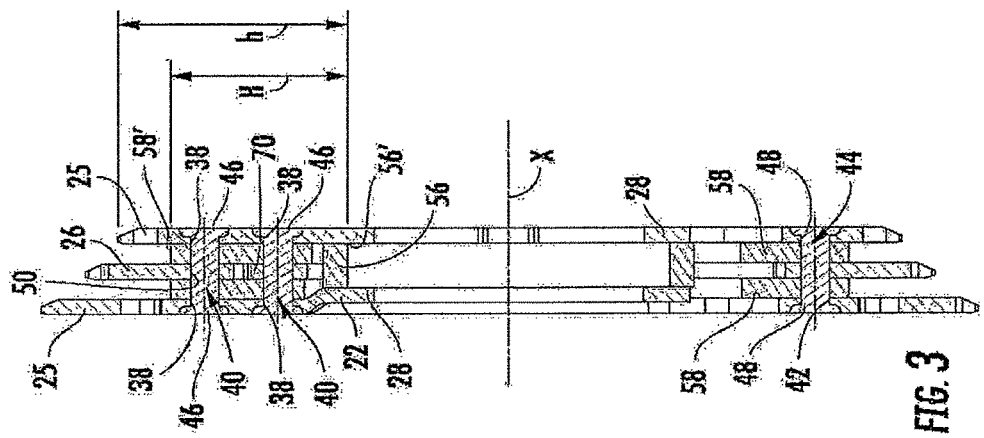

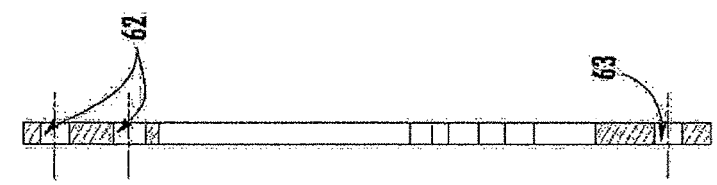
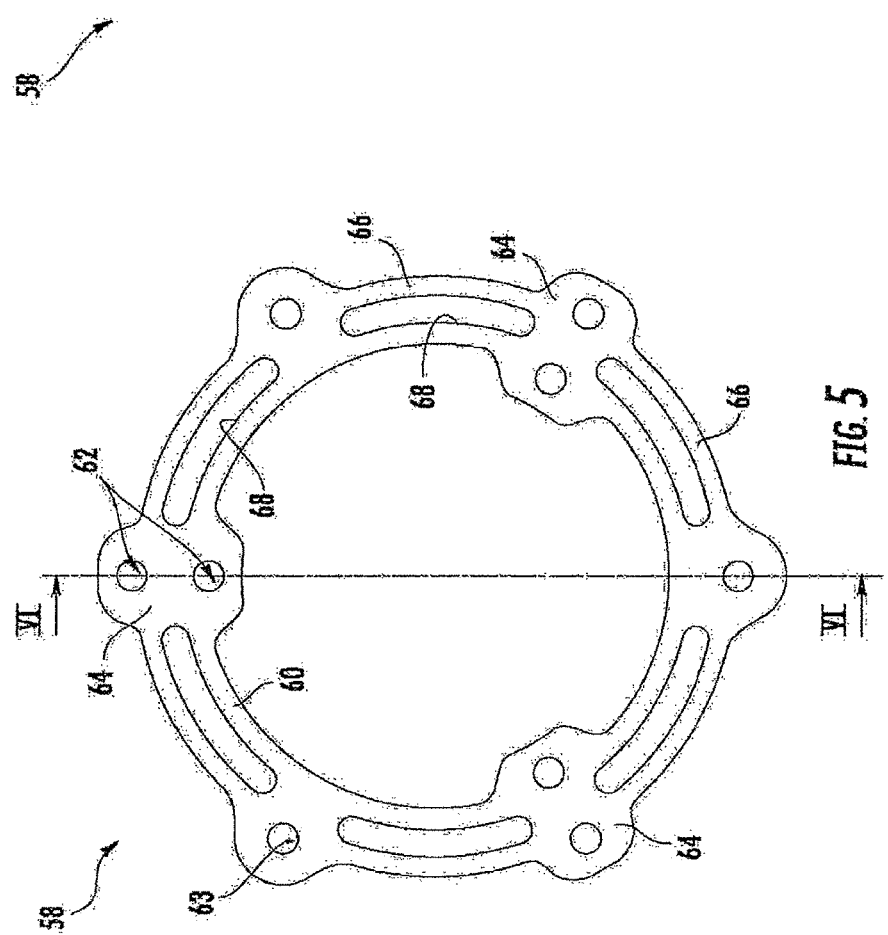

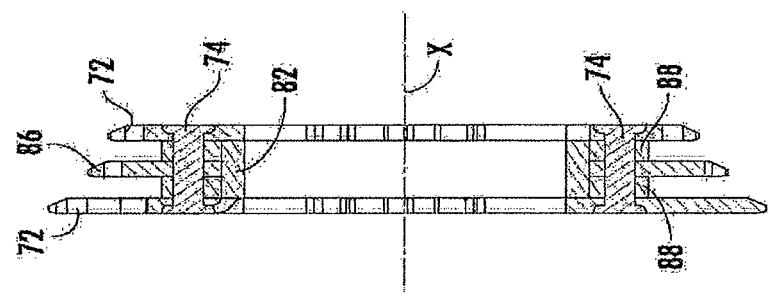
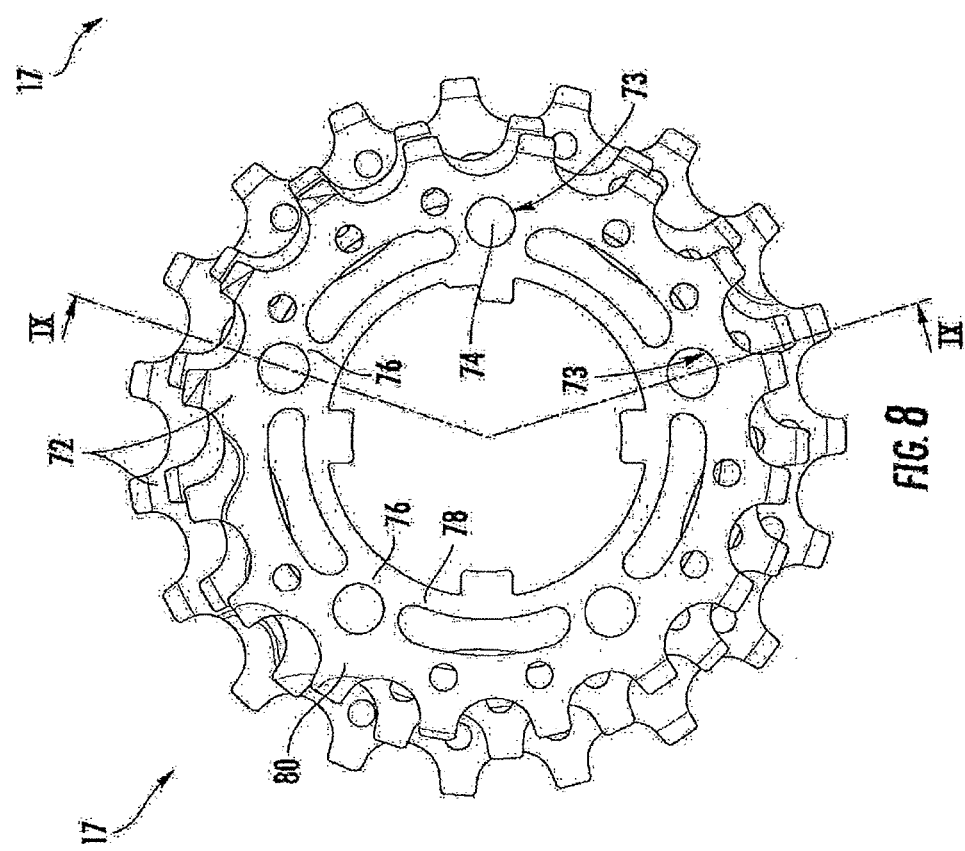

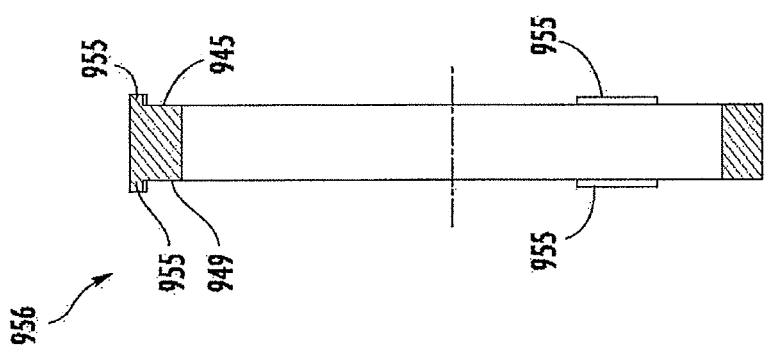
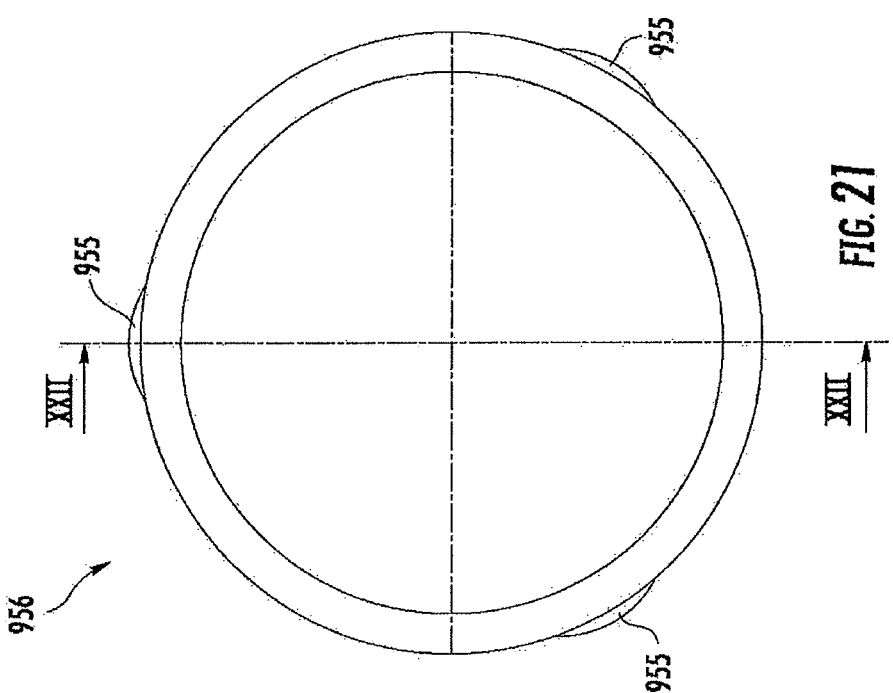

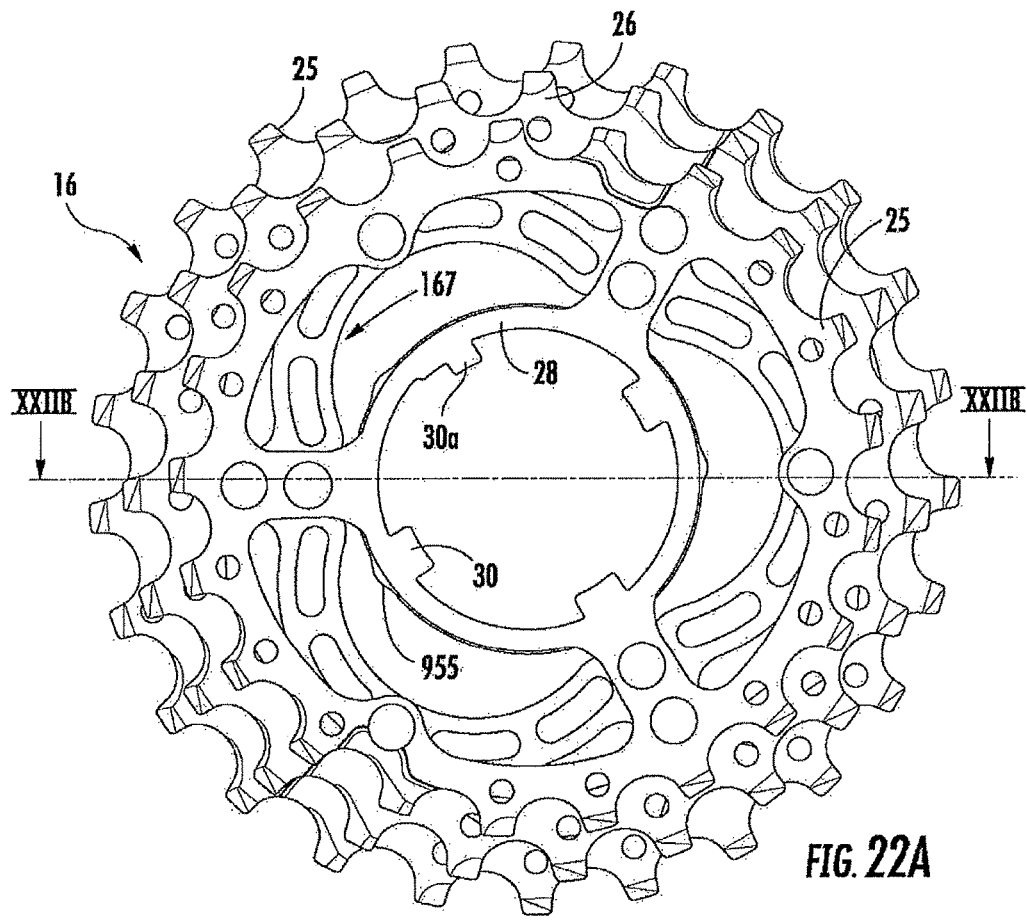
FIG. 22A
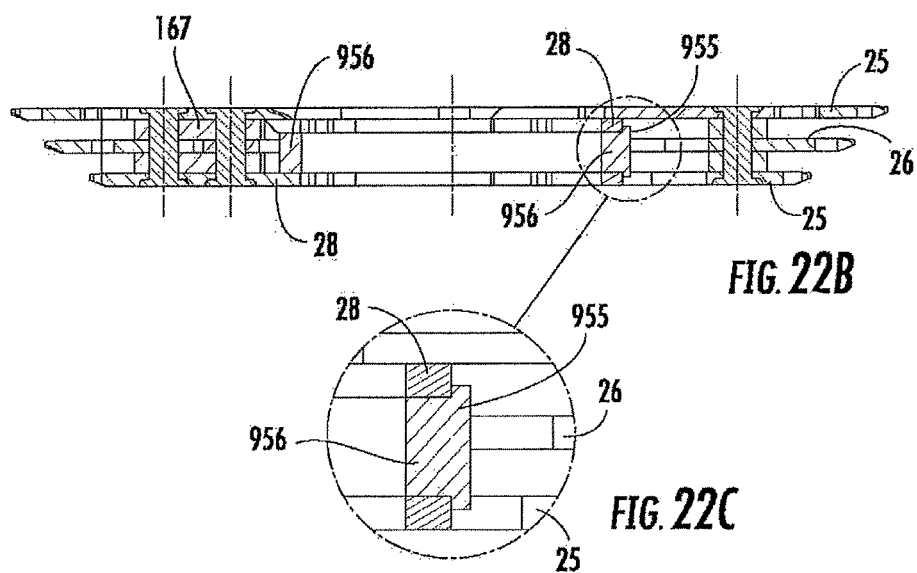
FIG. 22B
FIG. 22C

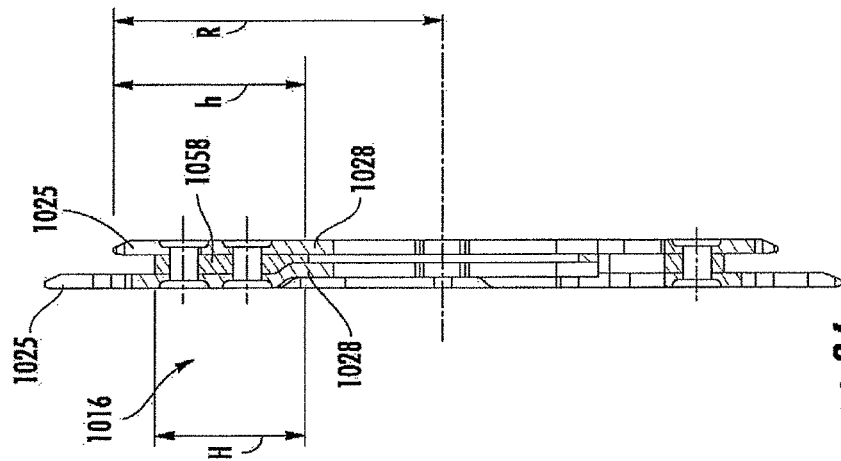
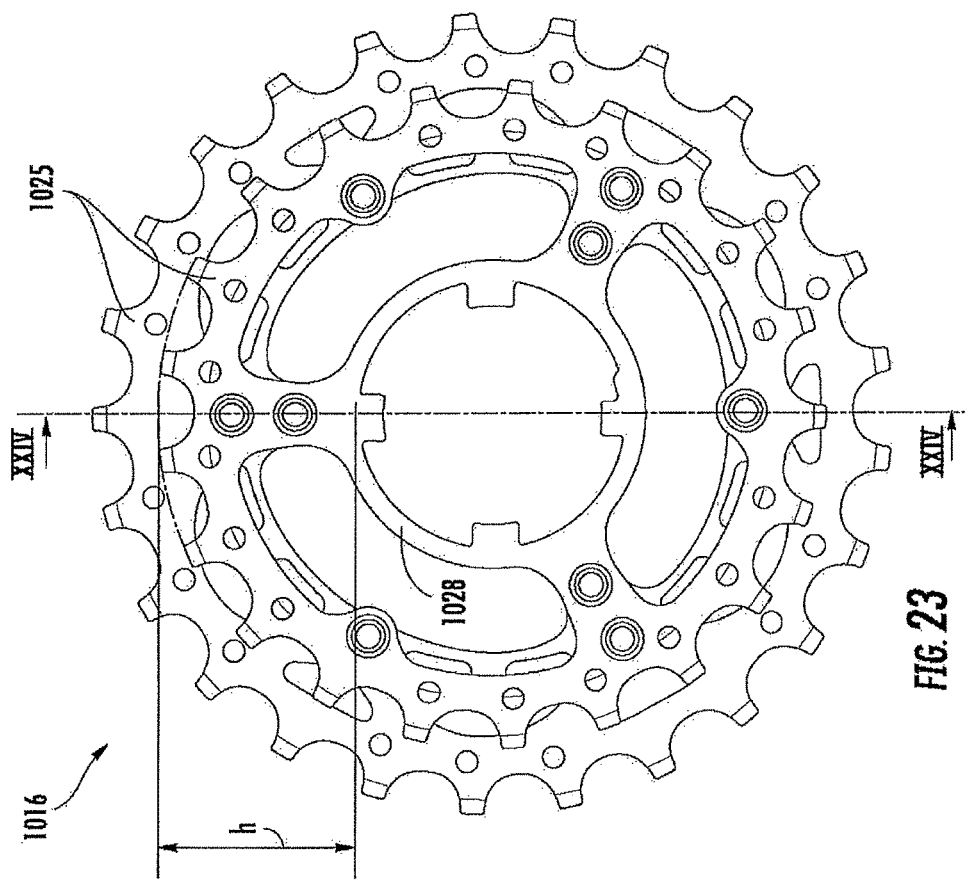

US 10,337,599 B2

SPROCKET MODULE FOR A BICYCLE AND SPROCKET ASSEMBLY COMPRISING SUCH A MODULE

CROSS REFERENCE TO RELATED APPLICATIONS

This application is a continuation of U.S. patent application Ser. No. 12/187,643, filed Aug. 7, 2008, which claims priority from Italian Patent Application MI2007A001658, filed Aug. 9, 2007, and is a co-pending application of U.S. patent application Ser. No. 14/299,686, filed Jun. 9, 2014, all of which are incorporated by reference as if fully set forth.

FIELD OF INVENTION

The field of the invention relates to a sprocket module for a bicycle.

BACKGROUND

A conventional motion transmission system comprises, in the rear part of the bicycle, a wheel equipped with a hub comprising a body element, in the jargon known as "freewheel body," capable of rotating idly with respect to the hub in one direction of rotation and of making it rotate in the opposite direction.

The freewheel body is generally cylindrical with outer grooves adapted to engage the sprockets of a sprocket assembly. The sprockets in turn are engaged and made to rotate by a chain, which receives the movement from at least one guide toothed wheel associated with a crank arm. This entire assembly can be heavy and in an effort to reduce this weight, some lighter designs can be weak.

SUMMARY

Throughout the present description and in the subsequent claims by expression "sprocket module" is used to indicate a structural unit comprising at least two sprockets of different diameter fixedly coupled one another.

A sprocket module for a bicycle has at least two sprockets fixedly coupled one another, wherein at least one first sprocket of the at least two sprockets has engagement means to a freewheel body of a hub for a bicycle rear wheel.

BRIEF DESCRIPTION OF THE DRAWINGS

Certain characteristics and advantages shall become clearer from the following detailed description of some preferred embodiments thereof, made with reference to the attached drawings, given for indicating and not limiting purposes. In these drawings:

FIG. 2 schematically represents a front view of a sprocket module, in particular of the module of FIG. 1 comprising the three sprockets with the largest diameter;

FIG. 3 schematically represents a diametric section of the module of FIG. 2, taken according to the plane traced with the line III-III of FIG. 2;

FIGS. 5 and 6 schematically represent a front view and a diametric section, taken according to the plane traced with the line VI-VI of FIG. 5, of an annular spacer element of the module of FIG. 2 (the module of FIG. 2 has two of such spacer elements);

FIGS. 8 and 9 schematically represent a front view and a diametric section, taken according to the plane traced with the line IX-IX of FIG. 8, of a second embodiment of a module, in particular of the module of FIG. 1 next to the module of FIG. 2;

FIGS. 21, 22, and 22a-c show views and sections of another embodiment showing the cylindrical spacer;

FIGS. 23 and 24 schematically represent a front view and a diametric section, taken according to the plane traced with the line XXIV-XXIV of FIG. 23, of an alternative embodiment of a module;

DETAILED DESCRIPTION OF THE PREFERRED EMBODIMENT(S)

Introduction

Figure 1:
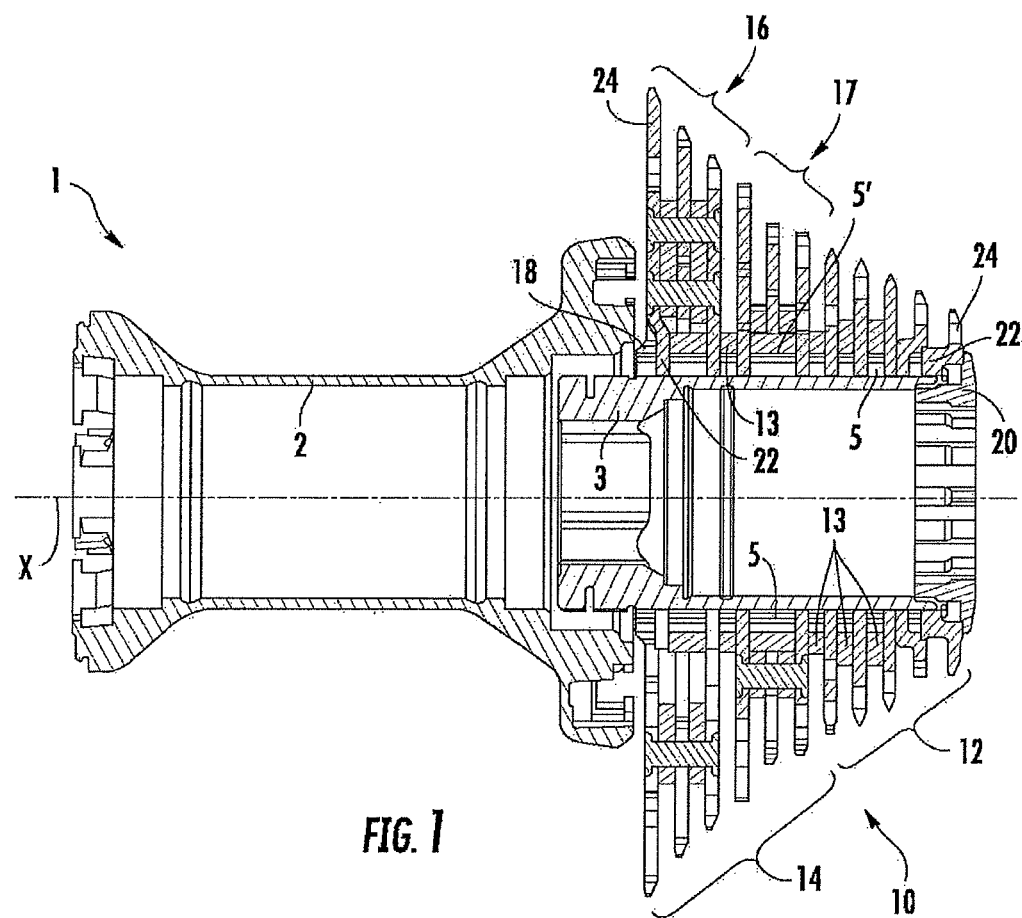
FIG. 1 schematically represents a longitudinal section of a hub for a bicycle rear wheel on which a plurality of sprocket modules is mounted.

In a first embodiment of the sprocket module, all of the sprockets of the sprocket module comprise the engagement means.

In an embodiment of the sprocket module, at least one second sprocket of the at least two sprockets lacks the engagement means and is supported by the at least one first sprocket. In this way, some sprockets, selected from those that constitute the module, act both as a coupling element with the freewheel body and as a support element for the other sprockets of the module. The supported sprockets therefore do not need to extend up to the freewheel body, reducing weight.

The sprocket module may comprise three sprockets facing one another along an axial direction of the sprocket module, wherein the at least one second sprocket is the central sprocket and the at least one first sprocket is at least one of the other two sprockets.

In this way, in the case in which the sprocket assembly comprises some of such modules, it is possible to easily replace even just a part of the sprockets to personalize the sprocket assembly according to the route to be traveled or the training planned by the cyclist.

In another embodiment of the sprocket module, both of the other two sprockets comprise the engagement means and the central sprocket is supported by both of the other two sprockets. In this way, the support of the central sprocket is optimally divided between the two adjacent first sprockets, arranged on opposite sides with respect to the central sprocket.

The at least one first sprocket comprises a radially inner annular portion provided with the engagement means, a radially outer annular portion, concentric to the radially inner annular portion, provided with a toothing for engaging with a bicycle chain, and a plurality of radial portions extending between the radially inner annular portion and the radially outer annular portion.

The sprocket described above uses a minimum amount of material, while ensuring a high strength at the portions most-stressed in operation.

Each radial portion of the plurality of radial portions comprises at least one first hole adapted to receive a respective first fixing element for the coupling of the at least one first sprocket with at least one other sprocket of the module.

In an embodiment of the module, each radial portion comprises a single first hole.

In this case, in order to reduce as much as possible the weight of the sprocket, each radial portion comprises, in a radially inner position with respect to the first hole, at least one lightening opening.

In a further embodiment of the module, each radial portion comprises two first holes. These two first holes may be aligned along a radial direction and comprise a first radially inner hole and a first radially outer hole.

In this way, the sprockets are coupled together for a high radial extension and deform little or not at all when stressed by the bicycle chain, thus increasing the efficiency of transmission of the torque.

The at least one first sprocket may comprise, in the radially outer annular portion and between two consecutive radial portions, at least one additional first hole adapted to receive a respective additional fixing element for the coupling of the at least one first sprocket with another sprocket of the module.

This provision allows a better mutual coupling of the support sprockets, increasing their strength against the bending and the twisting deformations to which they are subjected during operation.

The at least one additional first hole may be arranged at the same radial distance as the radially outer first hole. Such a provision, amongst other things, makes it easier to mount the sprockets.

The at least one second sprocket may comprise a substantially annular body provided with an outer toothing and with a plurality of second holes adapted to receive the first fixing elements for the coupling of the at least one second sprocket with the at least one first sprocket. Such a second sprocket, therefore, not having engagement portions with the freewheel body of the hub, is particularly light.

The at least one second sprocket may comprise a plurality of radial projections extending cantilevered in a radially inner direction from the substantially annular body, the second holes being formed in the radial projections.

Further, each of the second holes may be axially aligned with a respective first hole.

In the case in which the support sprocket, at each radial extension, has two radially aligned first holes, each of the second holes may be axially aligned with a respective radially outer first hole or with a respective additional first hole.

In this way, the supported sprockets are coupled with the same fixing elements that join the support sprockets, so that the overall number of fixing elements used in the sprocket module is reduced, in this way reducing the weight of such a sprocket module.

Moreover, since the supported sprockets are coupled just with the fixing elements engaged in the radially outer first holes, and possibly in the additional first holes, of the support sprockets, the radial extension, or height, of the supported sprockets is limited and their weight is reduced.

In an embodiment of the sprocket module, the second holes extend along a circumference may be defined at a minimum radial distance from a radially outer end of the at least one second sprocket, adapted to allow engagement of the chain on the sprocket of the sprocket module having the smallest diameter.

The radially inner annular portion may be axially shifted with respect to the radially outer annular portion towards a central area of the sprocket module, so that the module occupies less space in the axial direction, both at the engagement portions with the freewheel body, and at the toothed crowns of the sprockets. In this way, it is possible to mount a large number of sprockets on the freewheel body without needing to modify the respective standardized sizes of the freewheel body and/or of the bicycle frame.

The sprocket module may comprise at least one spacer element operatively interposed between the at least two sprockets. The at least one spacer element has a structural capability such as to rigidify the module itself.

The at least one spacer element may lack the engagement means to the freewheel body of the hub, so as to limit the weight of the sprocket module as much as possible.

Moreover, the at least one spacer element is in abutment with the at least one first sprocket at least one first contact area defined in the radially inner annular portion and at least one second contact area arranged at a different radial distance from that of the at least one first contact area.

In this way, the sprockets have a support against the deformation for a substantial radial height and the module is thus more rigid. Since the resistance of each sprocket to the deformation due to the action of the torque transmitted by the bicycle chain also depends upon the nearby sprockets, the thickness of the sprockets of the sprocket module can be lower than that of the sprockets of conventional sprocket assemblies.

The at least one second contact area may be defined at the radial portions. Further, the at least one spacer element may be in abutment with the at least one second sprocket at the radial projections.

In an embodiment of the sprocket module, it comprises a first spacer element in abutment with the at least one first sprocket at the inner annular portion and a second spacer element, different from the first spacer element, in abutment with the at least one first sprocket at the radial portions.

In this way, each spacer element consists of a piece having a shape that is very simple and therefore easy to obtain at a low cost. Moreover, it is possible to make the spacer elements intended to provide support in different areas with materials of different specific weight and different strength.

The second spacer element is in abutment with the at least one first sprocket at the first holes and with the at least one second sprocket at the second holes.

The second spacer element is in abutment with the at least one first sprocket at the additional first holes.

In general, the at least one spacer element may be made from a lighter material than that of the at least two sprockets.

The first spacer element may be made from a polymeric or reinforced plastic material, and may be able to withstand mainly the compression stresses typically present in the radially most inner areas of the sprockets.

The second spacer element may be made from a light metallic material (for example a light alloy) or a composite material (for example comprising structural fibers incorporated in a matrix of polymeric material), so as to have a greater structural capability than the first spacer element and to be able to withstand mainly the bending and twisting stresses typically present in the radially most outer areas of the sprockets due to the pulling action exerted by the bicycle chain.

In another embodiment of the sprocket module, the second spacer element may comprise a substantially annular body having a plurality of portions elongated in the radial direction and connected by respective bridge portions, in which each portion elongated in the radial direction comprises at least one third hole axially aligned with a respective first hole and with at least one respective second hole.

Each portion elongated in the radial direction may comprise two third holes and each bridge portion comprises at least one additional third hole axially aligned with a respective additional first hole and with at least one respective second hole.

Further, the two third holes may be aligned along a radial direction and comprise a radially inner third hole axially aligned with a respective radially inner first hole and a radially outer third hole aligned with a respective radially outer first hole.

The bridge portions circumferentially may extend between two portions elongated in the radial direction and are associated with a median area of the portions elongated in the radial direction.

In a further embodiment of the sprocket module, the bridge portions extend between two portions elongated in the radial direction and are associated with a radially inner area of the portions elongated in the radial direction so as to define respective humps.

In this way, free zones are created in the vicinity of the fixing areas to the elongated portions, in which the bridge portions do not completely obstruct the space between one sprocket and the other, thus leaving a way out both in the axial direction and in the radial direction for the mud or other sediments that may be deposited on the sprocket assembly.

In a further embodiment of the sprocket module, the bridge portions extend between two portions elongated in the radial direction and are associated with a radially outer area of the portions elongated in the radial direction so as to define a ring, the portions elongated in the radial direction extending cantilevered from the ring inwardly.

Each bridge portion may comprise at least one lightening cavity.

Further, each bridge portion may comprise at least two lightening cavities arranged on opposite sides with respect to a respective additional third hole.

In another embodiment thereof, the sprocket module may comprise at least one spacer ring axially interposed between two second spacer elements around respective radially inner holes.

In another embodiment of the sprocket module, the second spacer element may comprise a substantially annular body having a plurality of third holes axially aligned with respective first holes and with respective second holes, and the first spacer element may comprise a substantially annular portion comprising a plurality of arms projecting cantilevered from the substantially annular portion in the radial direction outwardly and in abutment with the at least one first sprocket at the radially inner first hole.

In a further embodiment of the sprocket module, the at least one spacer element is made in a single piece and comprises a radially inner annular portion in abutment with the at least one first sprocket at the inner annular portion and a forked portion that extends radially outwardly from the radially inner annular portion.

The forked portion may comprise a pair of radially outer substantially annular portions, facing one another in the axial direction and in abutment against respective first sprockets at the first holes and at the additional first holes and a plurality of pairs of arms facing one another in the axial direction and extending between the radially inner annular portion and the radially outer substantially annular portion, the arms being in abutment with the at least one first sprocket at the radial portions.

The pair of radially outer substantially annular portions may be in abutment with the at least one second sprocket at the second holes.

The radially inner annular portion may be made from a light metallic material and the forked portion is co-molded with the radially inner annular portion in a composite material. In this way the radially inner annular portion withstands compression and the forked portion withstands bending and twisting well.

In a further embodiment of the sprocket module, the second spacer element comprises a plurality of connection elements mutually associated at the respective free end portions to form a substantially annular structure.

Each connection element may comprise a forked central portion. Further, the forked central portion may be elongated in the radial direction and may be provided with a pair of third holes axially aligned with the holes of a respective pair of first holes and respective arms circumferentially extending cantilevered from opposite sides of the central portion on parallel planes and having respective end portions provided with respective additional third holes axially aligned with a respective additional third hole of an adjacent connection element and with a respective first hole.

The additional third holes may be axially aligned with a respective second hole.

This embodiment may be lighter than those with completely annular structural spacer elements, since there are circumferential portions between two adjacent sprockets in which there is only one arm of a spacer element.

Each arm may be associated with a radially inner portion of the central portion of the respective connection element, so that there remains a free area between the arms and the sprockets to allow the passage of the mud and other impurities. Moreover, the presence of a single arm below these areas makes the passage even easier.

In general, the first spacer element comprises a plurality of teeth projecting in the axial direction for coupling with the radially inner annular portion of the at least one first sprocket. Such teeth ensure the precise positioning and the holding in the position of the first spacer element with respect to the support sprocket.

The engagement means of the first sprocket may define an ideal circumference of coupling with the freewheel body, the first sprocket resting against one or more spacer elements between a first most radially inner extreme resting point and a second most radially outer extreme resting point, the extreme resting points being arranged at a distance equal to ⅓ of the radial extension between the ideal circumference and a radially outer end of the smallest sprocket of the at least two sprockets.

With the aforementioned radial distance the sprockets have a support against the deformation for a radial height that is sufficient to give strength to the sprockets themselves, thus allowing their thickness to be reduced.

Of course, the greater the radial distance is, the greater is the rigidity that derives to each individual sprocket for the resting to the nearby sprockets.

The distance between the extreme resting points may be at least equal to ½, and even more preferably at least equal to ⅔, of the radial extension between the ideal circumference and the radially outer end of the smallest sprocket.

The aforementioned smallest sprocket may have a number of teeth greater than or equal to 15, more preferably greater than or equal to 18.

In another embodiment of the sprocket module, the at least two sprockets are in abutment with each other, through the at least one spacer element, at least two contact areas at the extreme resting points and at an intermediate contact area. In this way, the contact area between sprockets and spacer element is increased, giving the sprockets themselves greater strength.

Further, the at least two sprockets are in abutment with each other, through the at least one spacer element, at a surface portion extending between the two extreme resting points. The contact surface between sprockets and spacer element is thus increased further.

The at least two sprockets are in abutment with each other, through the at least one spacer element, at a plurality of contact areas arranged in a radially inner annular portion of the smallest sprocket.

The at least two sprockets may be in abutment with each other, through the at least one spacer element, along all of the radially inner annular portion.

Further, the first extreme resting point may belong to the radially inner annular portion.

In another of the sprocket module, the at least two sprockets may be in abutment with each other, through the at least one spacer element, at a plurality of contact areas arranged in a radially outer annular portion of the smallest sprocket.

The at least two sprockets may be in abutment with each other, through the at least one spacer element, along all of the radially outer annular portion.

Moreover, the second extreme resting point belongs to the radially outer annular portion.

In general, in another embodiment of the sprocket module, the at least two sprockets have a thickness of between 1 and 2 mm, more preferably between 1.4 and 1.7 mm.

In yet another embodiment, a sprocket assembly for a bicycle rear wheel, may comprise at least one sprocket module.

Such a sprocket assembly for a bicycle rear wheel may have, individually or in combination, all of the structural and functional characteristics discussed above with reference to the sprocket module described above.

In particular, the sprocket assembly may comprise two sprocket modules and at least one spacer element operatively interposed between the two sprocket modules.

The sprocket assembly may also comprise a plurality of sprockets each of which is directly coupled with the freewheel body of the hub of the bicycle rear wheel.

In another embodiment, a sprocket for a bicycle rear wheel, may comprise a radially inner annular portion provided with engagement means to a freewheel body of a hub for a bicycle rear wheel and a radially outer annular portion, concentric to the radially inner annular portion, provided with a toothing for engaging with a bicycle chain, wherein that it comprises a plurality of radial portions extending between the radially inner annular portion and the radially outer annular portion.

The sprocket described above uses a minimum amount of material, and therefore a very low weight, while still ensuring a high strength at the portions under most stress during operation.

At least one radial portion of the plurality of radial portions may comprise at least one hole adapted to receive a respective fixing element for the coupling of the sprocket with at least one other sprocket.

In an embodiment of the sprocket, each radial portion of the plurality of radial portions comprises a respective hole.

In order to reduce as much as possible the weight of the sprocket, each radial portion comprises, in a radially inner position with respect to the respective hole, at least one lightening opening.

In a further embodiment of the sprocket, each radial portion comprises two holes.

The two holes may be aligned along a radial direction and may comprise a radially inner hole and a radially outer hole.

In this way, the sprockets are coupled one another for a high radial extension and they deform little or not at all when stressed by the bicycle chain, thus increasing the efficiency of transmission of the torque.

The sprocket may comprise, in the radially outer annular portion and between two consecutive radial portions, at least one additional hole adapted to receive a respective additional fixing element for the coupling of the sprocket with the at least one other sprocket.

This provision allows a better mutual coupling of the sprockets, increasing their strength against the bending and twisting deformations to which they are subject during operation.

The at least one additional hole may be arranged at the same radial distance as the radially outer hole. Such a provision, among other things, makes it easier to mount the sprockets.

Of course, the sprocket according to the aforementioned third aspect can be used in the sprocket module according to the aforementioned first aspect.

In yet another embodiment, the bicycle may comprise at least one sprocket module according to earlier embodiments.

Such a bicycle has, individually or in combination, all of the structural and functional characteristics discussed above with reference to the sprocket module described above.

DETAILED DESCRIPTION

With initial reference to FIG. 1, a hub 1 for a bicycle rear wheel comprises a hub body 2 and an element of freewheel body 3 (hereafter referred to as "freewheel body"). The freewheel body 3 is coupled with the hub body 2 through a known system such as that shown in US Pub. 2006/0231366, incorporated herein by reference as if fully set forth (but in no way limiting in its manner of engagement or design), through which the freewheel body 3 can rotate idly in a direction of rotation about a rotation axis X and trail the hub body 2 with it in the opposite direction of rotation.

The freewheel body 3 has a substantially cylindrical shape with some grooves 5 on the outer surface thereof.

A sprocket assembly 10, which as shown has eleven sprockets although other numbers of sprockets are possible, is mounted on the freewheel body 3, engaged with the grooves 5. The sprocket assembly 10 comprises a series 12 of sprockets that are independent from one another and a series 14 of sprockets constrained to one another.

The independent sprockets of the series 12 are spaced apart from one another through cylindrical spacer elements 13 that do not engage with the freewheel body 3. The series of constrained sprockets 14 comprises two sprocket modules 16 and 17 arranged side-by-side and spaced apart by a cylindrical spacer element 13.

When the independent sprockets of the series 12 and the constrained sprockets of the series 14 are mounted on the freewheel body 3, they stop against an element of axial abutment 18 of the freewheel body 3 and are held by a ring nut 20 screwed onto the freewheel body 3.

The first sprocket (the sprocket with the largest diameter) and the last sprocket (the sprocket with the smallest diameter) of the sprocket assembly 10 have an engagement portion 22 with the freewheel body 3 axially shifted with respect to a toothed crown 24 for engaging with a chain (not illustrated). In particular, the engagement portion 22 of the first sprocket of the sprocket assembly 10 is shifted in the axial direction towards the outside of the hub body 2, i.e. towards the ring nut 20, or in other words towards a central area, in the axial direction, of the module 16, whereas the engagement portion 22 of the last sprocket of the sprocket assembly 10 is shifted in the axial direction towards the inside of the hub body 2, i.e. towards the element of axial abutment 18.

The module 16 is better illustrated in FIGS. 2 and 3 and comprises two support sprockets 25, arranged at the ends according to the direction of the rotation axis X, and a supported sprocket 26 arranged between the support sprockets 25.

The support sprockets 25 comprise a radially inner annular portion 28 for engagement with the freewheel body arranged in the radially most inner area thereof, the portion 28 being equipped with engagement means with the freewheel body 3. In the example of FIGS. 2 and 3 the portion 28 is equipped with teeth 30 and grooves 32 adapted to respectively couple with the grooves 5 and the teeth between the grooves 5 themselves of the freewheel body 3. One of the teeth 30a has a shape different to the others to allow the support sprocket 25 to be mounted on the freewheel body 3 in a single predetermined position.

The support sprockets 25 also comprise a radially outer annular portion 34, concentric to the radially inner annular portion 28 and provided with a toothing for engaging with a bicycle chain. The portion 34 will also be referred to as "toothed crown" hereinafter.

The annular engagement portion 28 and the toothed crown 34 are joined one another through connecting portions 36, preferably radial, also known as "arms". The arms 36 comprise two holes 38 arranged at different radial distances from the axis X. The holes 38 of the two support sprockets 25 are aligned with one another in the axial direction and respective rivets 40—or other fixing elements like screws, bolts or pins—that make the two support sprockets 25 integral with one another, engage in them.

The support sprockets 25 also comprise respective additional holes 42, aligned with one another in the axial direction, in which additional rivets 44 engage.

The holes 38 and 42 are preferably identical and comprise a portion with a greater diameter and a portion with a smaller diameter. The portion with a greater diameter provides a housing and resting area for the heads 46 and 48 respectively made at the opposite free ends of the rivets 40 and 44.

In the example of FIGS. 2 and 3, there are three additional holes 42 and they are angularly arranged equally spaced apart on the same ideal circumference at the radially outer annular portion 34 of the support sprockets 25; there are three arms 36 and they are angularly arranged equally spaced apart one another, staggered apart one another by about 120° and staggered by about 60° with respect to the additional holes 42.

Figure 7:
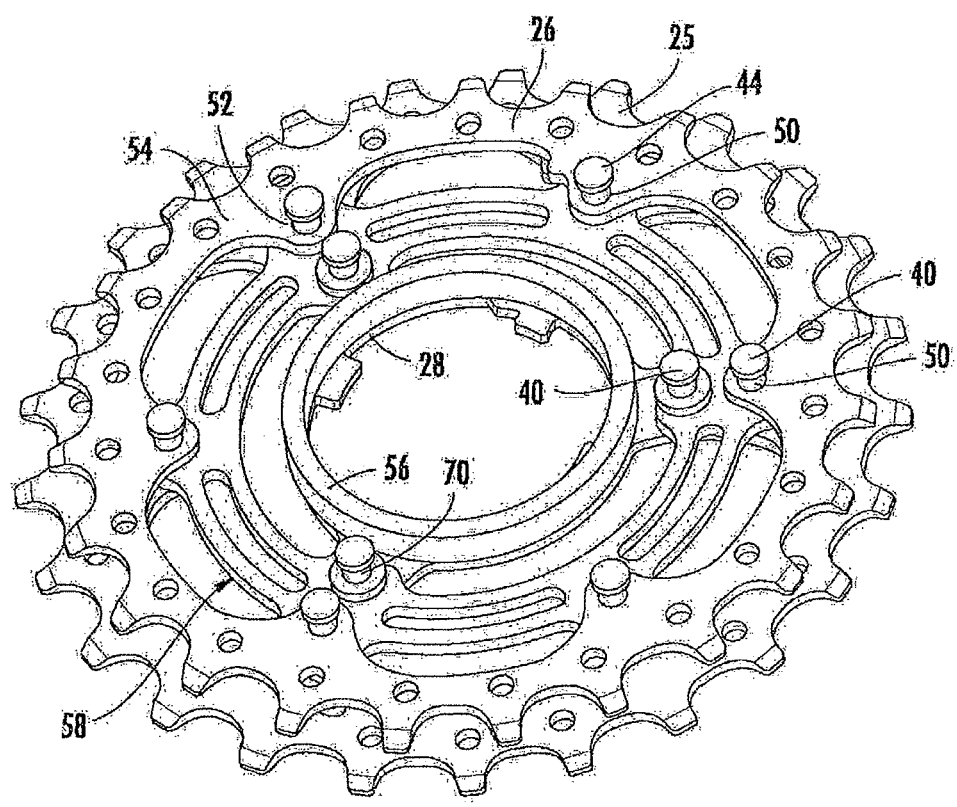
FIG. 7 schematically represents a perspective view of the module of FIG. 2 in which the sprocket with the smallest diameter and one of the two spacer elements have been removed, in order to illustrate the parts hidden by them.

The intermediate sprocket 26, more clearly visible in FIG. 7, where some parts of the module 16 have been removed, differs from the end sprockets 25 due to the absence of engagement portions with the freewheel body 3. Moreover, this sprocket 26 has holes 50 adapted to be aligned just with the most radially outer holes 38 and with the additional holes 42 of the support sprockets 25. In this way the intermediate sprocket 26 is supported by the support sprockets 25 through the most radially outer rivets 40 and the additional rivets 44.

In the example of FIG. 7, therefore, there are six holes 50 and they are angularly equally spaced apart by about 60°.

The holes 50—and therefore also the holes 38 and 42 with which they are aligned—are all arranged at the same radial distance from the rotation axis X. It should be noted that such a radial distance has a lower limit, since it is necessary to allow the engagement of the chain on the sprocket 25 with the smallest diameter. Such a radial distance is preferably selected so as to minimize the distance between the circumference defined at the outer end of the toothed crown 34 and the circumference defined at the maximum radial size of the holes 38 and 42 on the sprocket 25 with the smallest diameter.

The intermediate sprocket 26 comprises a radially outer toothed annular portion, or toothed crown, indicated with 54. The holes 50 are made on radial projections 52 extending cantilevered towards an inner or central area of the sprocket 26 starting from a radially inner circumferential end portion of the toothed crown 54. It should be noted that the intermediate sprocket 26, not comprising engagement portions with the freewheel body 3 nor connecting arms, nor radially inner annular portions, is lighter than the support sprockets 25.

The sprockets 25 and 26 of the module 16 are kept at a predetermined distance apart one another through spacer elements that—providing resting in the axial direction— prevent sliding of the rivets 40 and 44 and rigidify the sprockets preventing the bending and twisting deformations due to the pulling action of the chain.

The spacer elements can be of various sizes and shapes, so as to make them easier and more cost-effective to manufacture. In particular, in the example illustrated in FIGS. 2-4 and 7, a first cylindrical spacer element 56 is provided arranged between the engagement portions 22 of the two support sprockets 25. The spacer element 56 is preferably free, in the sense that it is not fixed to the sprockets but is inserted in the space between the engagement portions 22 from which it cannot come out due to its radial dimensions. It may also be held by contact pressure between spacer element 56 and sprockets 25. The material used is preferably any material resistant to compression, more preferably a polymeric material or a reinforced plastic material, i.e. a polymeric material to which non-structural reinforcement elements have been added, normally powders, granules or short fibers, i.e. of a size lower than five millimeters.

Figure 4:
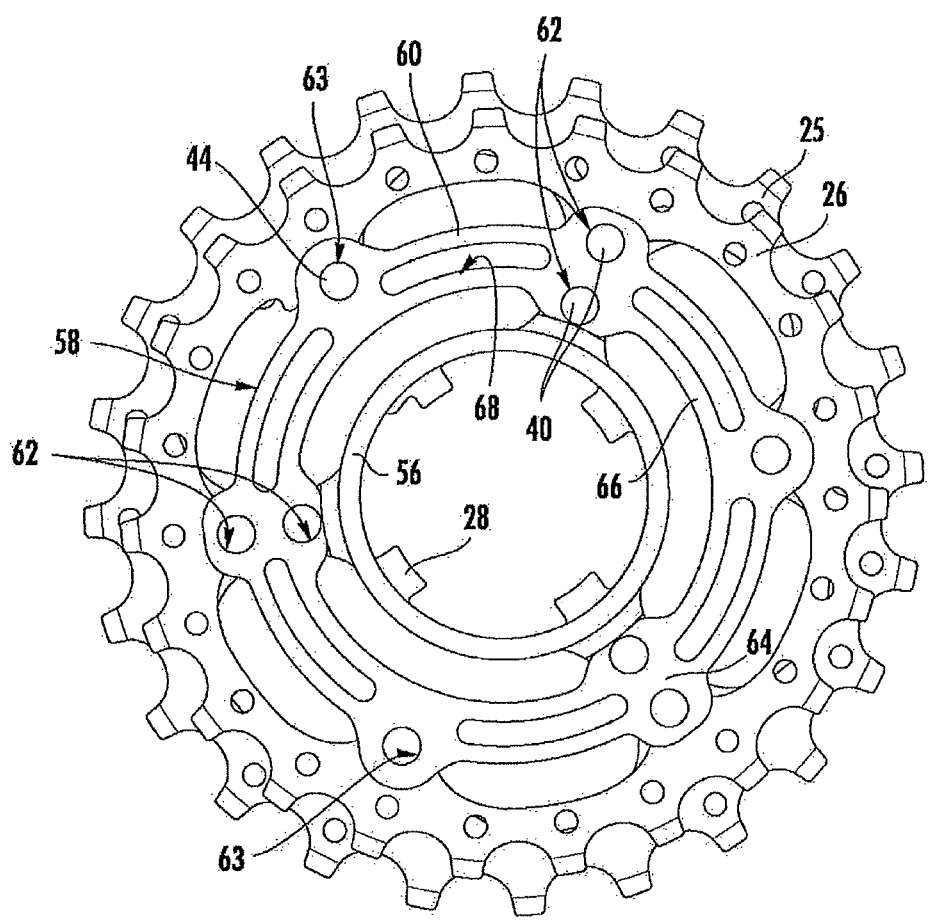
FIG. 4 schematically represents a front view of the module of FIG. 2 in which the sprocket with the smallest diameter has been removed, in order to illustrate the parts hidden by it.

Two annular spacer elements 58, identical in the size and in the shape, are interposed between each support sprocket 25 and the intermediate sprocket 26 and can be clearly seen in FIG. 4, which shows the module 16 without the sprocket with the smallest diameter 25, and in FIGS. 5 and 6.

Each spacer element 58 comprises a substantially annular body 60, on which holes 62 are made aligned with the holes 38 of the support sprockets 25 and with respective holes 50 of the intermediate sprocket 26 for the passage of the rivets 40 and additional holes 63 aligned with the additional holes 42 of the support sprockets 25 and with the remaining holes 50 of the intermediate sprocket 26 for the passage of the additional rivets 44.

The holes 62 may be made in a plurality of portions 64 elongated in the radial direction. In particular, the substantially annular body 60 comprises three portions 64 having a larger size in the radial direction. Such portions 64 are connected one another through bridge portions 66 on which lightening cavities 68 are made, preferably made in the form of through hollows, and the additional holes 63. Each bridge portion 66 comprises, in particular, two lightening cavities 68 arranged on opposite sides with respect to the respective additional hole 63.

The bridge portions 66 are projected in the circumferential direction starting from a median area of the portions 64 elongated in the radial direction.

In the module 16, the support sprocket 25 goes into abutment against the intermediate sprocket 26 and against the other support sprocket 25, through the cylindrical spacer element 56 and the annular spacer element 58, at a plurality of respective contact areas arranged at different radial distances. In particular, the radially inner annular portions 28 of the support sprockets 25 rest upon one another through the cylindrical spacer element 56, whereas the arms 36 and the coupling areas around the additional holes 42 of the support sprockets 25 rest respectively, on opposite sides, at the coupling areas around the holes 50 of the intermediate sprocket 26 through the portions 64 elongated in the radial direction of two different spacer elements 58 and the coupling portions around the holes 63 of the two spacer elements 58. The radial extension of the resting between the sprockets between a first most radially inner extreme resting point 56' (at the radially inner edge of the spacer 56) and a second extreme resting point 58' (at the radially outer edge of the spacer 58) is equal to ⅓, preferably ½, more preferably ⅔, of the radial extension between an ideal circumference 28' defined by the engagement means 28 to the freewheel body 3 and the radially outer end of the smallest sprocket of the module 16. As can be seen in FIGS. 2 and 3, the ideal circumference is defined by the surface of the annular portion 28 that in engagement condition is intended to go into contact with the outer cylindrical surface 5' (FIG. 1) of the freewheel body 3. It is also possible to hypothesize solutions in which the annular portion 28 does not go into contact with the outer surface of the freewheel body, however also in this case the ideal circumference coincides with the maximum outer diameter of the freewheel body that is thought to be engaged in the annular portion 28. In this way the height h always defines the part of sprocket projecting from the freewheel body 3.

As can be seen from the illustrated example, by extension of the resting it is meant the distance between the extreme resting points in the radial direction, since between the extreme points the effective resting can be discontinuous.

From what has been described above, it can thus be seen that in the module 16 each spacer element 58 is associated with a support sprocket 25 at a plurality of distinct coupling portions, and each sprocket is in abutment with an adjacent sprocket, through the spacer elements 56 and 58, at contact areas having high radial extension. A set of sprockets is thus made in which the spacer element 58 acts as structural reinforcement element of the sprockets, contributing to the increase in the structural strength of the individual sprockets.

Moreover, when the spacer element 58 is made from lighter material than the sprockets, the weight of the module 16 remains low. In order to have such a structural property the spacer element 58 can for example be made from light metallic alloy or from a composite material comprising structural fibers in a matrix of polymeric material.

Typically, the structural fibers are selected from the group consisting of carbon fibers, glass fibers, aramid fibers, ceramic fibers, boron fibers, polyester fibers and combinations thereof, the carbon fibers being preferred.

The arrangement of the structural fibers in the polymeric material can be a random arrangement of pieces or small pieces of structural fibers, a substantially unidirectional orderly arrangement of fibers, a substantially bi-directional orderly arrangement of fibers, for example woven according to a weft and a warp, or a combination of the above.

The polymeric material of the matrix may be thermosetting. However, this does not rule out the possibility of using a thermoplastic. Also, the matrix may comprise an epoxy resin.

Now with reference to FIGS. 3 and 7, between the two structural spacer elements 58, around the rivets 40 (and therefore around the holes 38) radially arranged more internally, there are cylindrical spacer rings 70 of limited radial size.

The cylindrical rings 70 and the spacer element 56 can be made from any material capable of withstanding an axial load, for example even of the same material as the structural spacer elements 58. The material may use a polymeric material or a reinforced plastic material, i.e. a polymeric material to which non-structural reinforcing elements have been added, normally powders, granules or short fibers, i.e. of a size lower than five millimeters.

FIGS. 8 and 9 illustrate the module 17 of the sprocket assembly 10 illustrated in FIG. 1. The module 17 has sprockets with a smaller diameter with respect to the module 16, and differs from it mainly in that the support sprockets 72 have holes 73 for the passage of rivets 74 (or of other fixing elements like screws, bolts or pins) just on connecting arms 76 between the radially inner annular portion 78 for the coupling with the freewheel body 3 and the toothed crown 80.

In the example of FIG. 8, there are five arms 76. Moreover, all of the holes 73 are arranged at the same radial distance from the rotation axis X and are angularly equally spaced apart one another.

Figure 10:
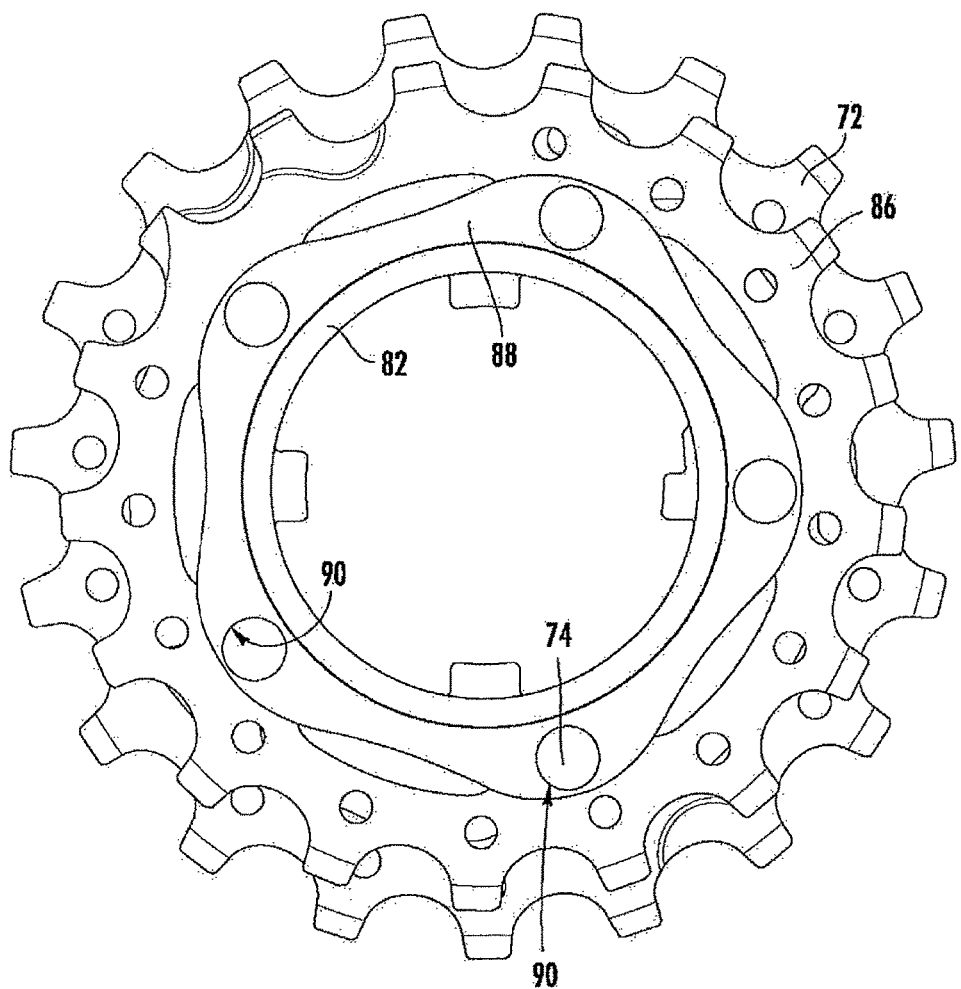
FIG. 10 schematically represents a front view of the module of FIG. 8 in which the sprocket with the smallest diameter has been removed, in order to illustrate the parts hidden by it.

Between the support sprockets 72 an annular spacer element 82 substantially identical to the spacer element 56 of the module 16 is interposed, whereas between each support sprocket 72 and a supported intermediate sprocket 86 a structural spacer element 88 similar to the structural spacer elements 58 of the module 16 is interposed, more clearly visible in FIG. 10, where the support sprocket 72 having a smaller diameter has been removed from the module 17. From FIG. 10 it is particularly clear that the structural spacer element 88 has holes 90 (in the example of FIG. 10 they are five) for passage of the rivets 74 or similar, and that at such holes 90 the structural spacer element 88 has a greater size in the radial direction with respect to the other areas.

Hereafter it shall be described alternative embodiments of the module 16 in which elements that are similar from the structural point of view, or corresponding elements from the functional point of view, are indicated by increasing the reference numerals assigned up to now by 100, or by a multiple thereof.

Figure 11:
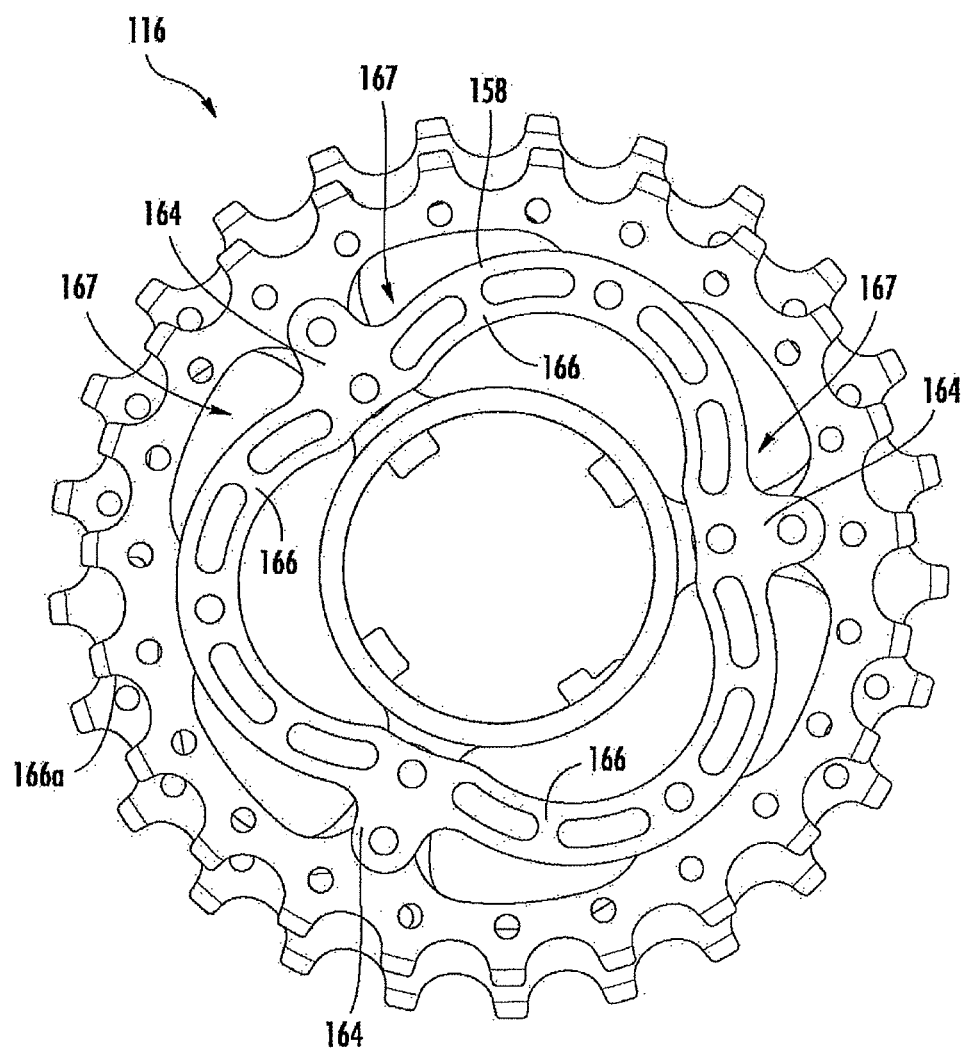
FIGS. 11, 12, 13 and 14 schematically represent front views of further embodiments of a module in which the respective sprockets with the smallest diameter have been removed, in order to illustrate the parts hidden by them.

FIG. 11 illustrates a module 116 similar to the module 16 of FIG. 2 and without the support sprocket with the smallest diameter (and therefore analogous to the part of the module 16 illustrated in FIG. 4). The module 116 differs from the module 16 solely in the shape of the structural spacer elements 158. In these spacer elements 158 the bridge portions 166 are circumferentially connected to portions 164 elongated in the radial direction, so as to define respective humps 166a. In this way free areas 167 are created close to the fixing areas to the portions 164 elongated in the radial direction, in which the bridge portions 166 do not completely obstruct the space between one sprocket and the other, especially between the two sprockets having smaller diameter, thus leaving a way out both in the axial direction and in the radial direction for the mud or other sediment that may be deposited on the sprocket assembly.

Figure 12:
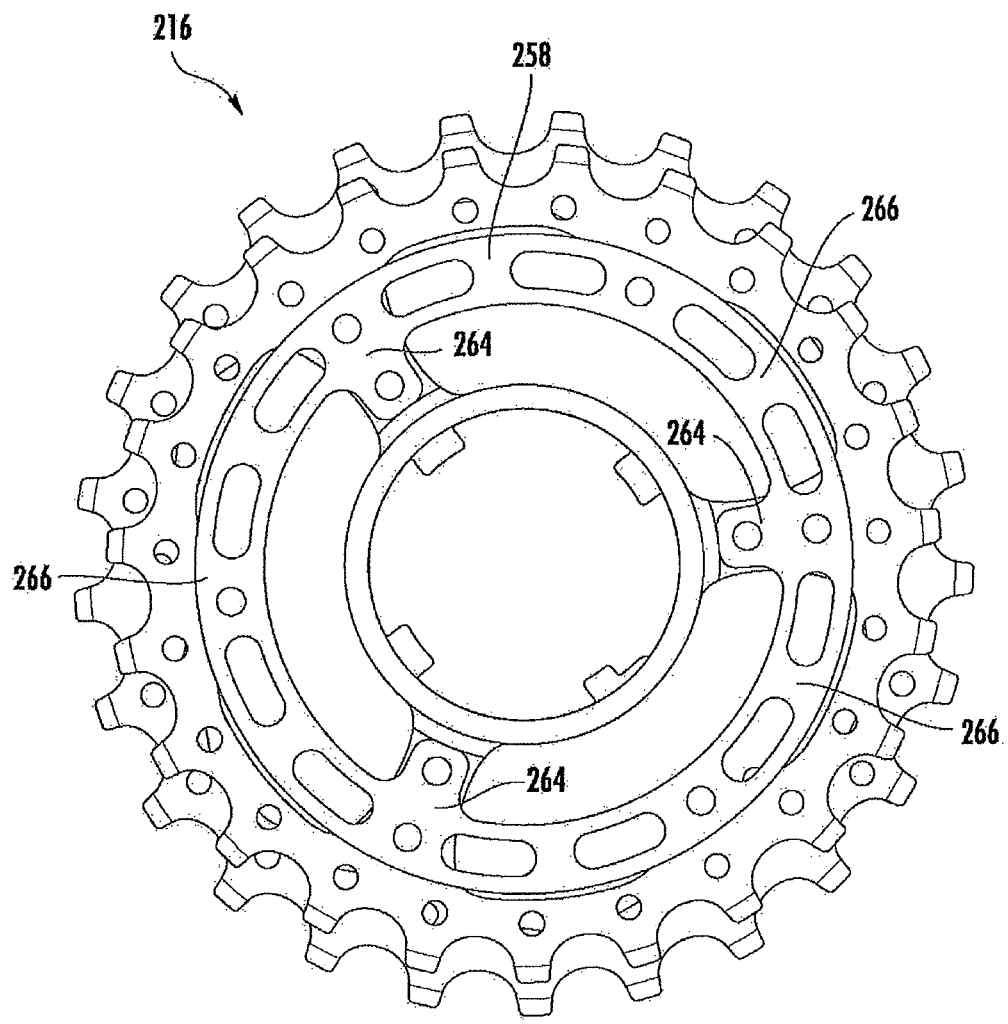

FIG. 12 illustrates a module 216 similar to the module 16 of FIG. 2 and again without the support sprocket with the smallest diameter (and therefore analogous to the part of the module 16 illustrated in FIG. 4). The module 216 differs from the module 16 for the shape of the structural spacer element 258. In particular, the bridge portions 266 extend between two portions 264 elongated in the radial direction and are associated with a radially outer area of the portions 264 elongated in the radial direction so as to define a ring. Such a ring is substantially circular crown shaped and the bridge portions 266 are interrupted just by the elongated portions 264 to which they are joined circumferentially in the radially most outer area. The portions 264 elongated in the radial direction thus extend cantilevered radially inwards from the ring.

Figure 13:
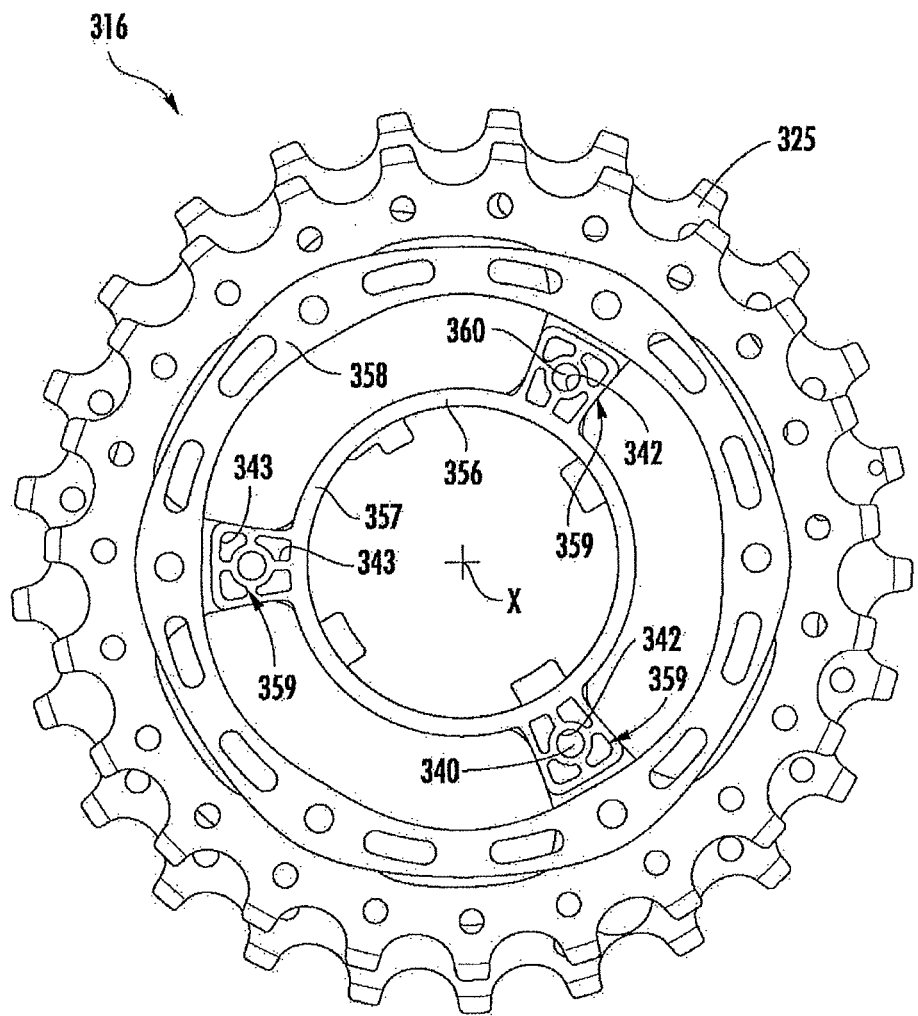

FIG. 13 illustrates a module 316 similar to the module 16 of FIG. 2 and again without the support sprocket with the smallest diameter (and therefore analogous to the part of the module 16 illustrated in FIG. 4). The module 316 differs from the module 16 for the shape both of the structural spacer elements 358 and of the radially most inner spacer element 356.

The structural spacer elements 358 are substantially annular bodies and comprise holes for the passage of rivets, or similar fixing elements, all arranged at the same radial distance from the axis X. The radially most inner spacer element 356 has a substantially annular portion 357, for example cylindrical, from which arms 359 project cantilevered, radially outwards, at the distal ends of which holes 342 are made for engagement with rivets 340, or similar fixing elements, which join the support sprockets 325 (only one is shown). The area of the arms 359 around the holes 342 is made lighter by openings 343.

Figure 14:
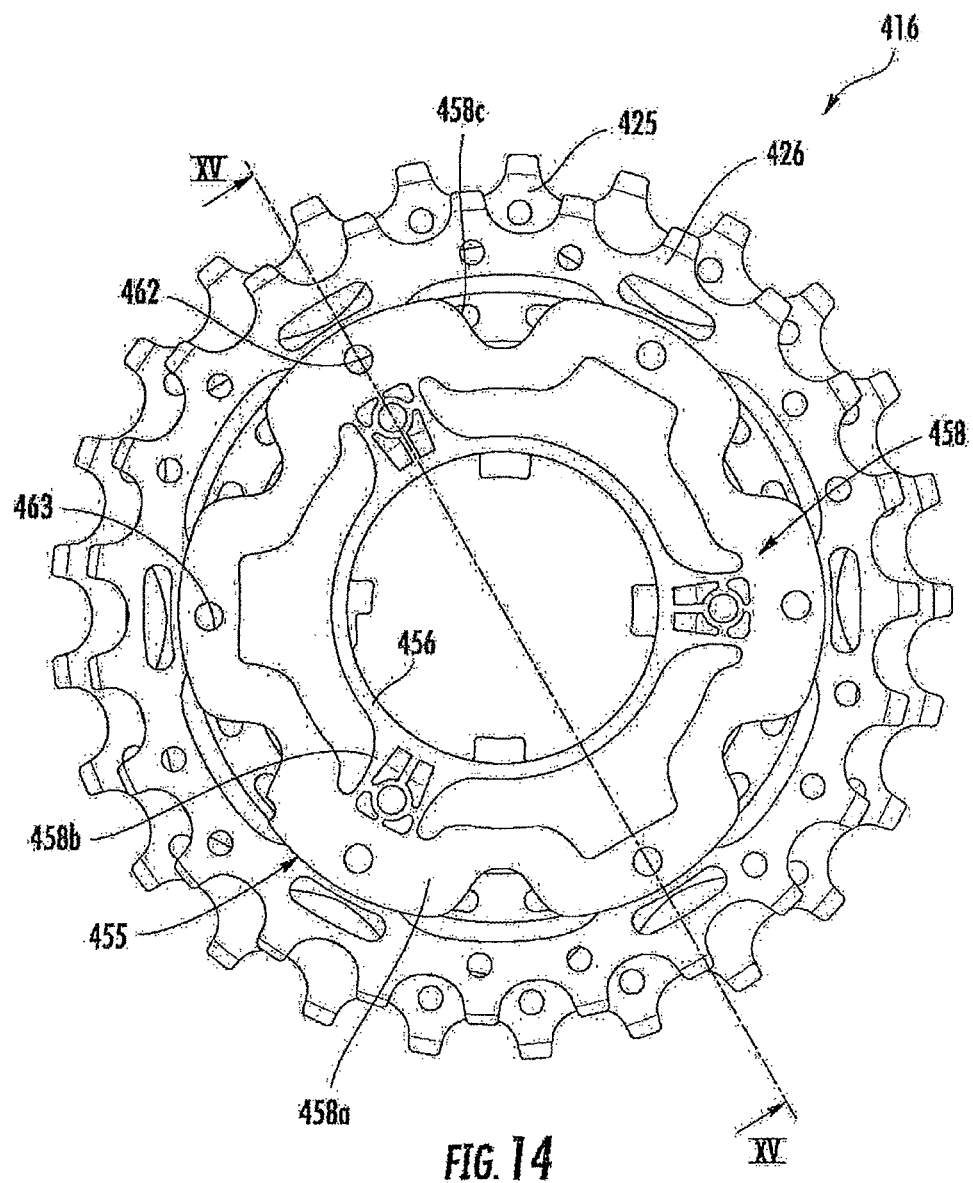
Figure 15:
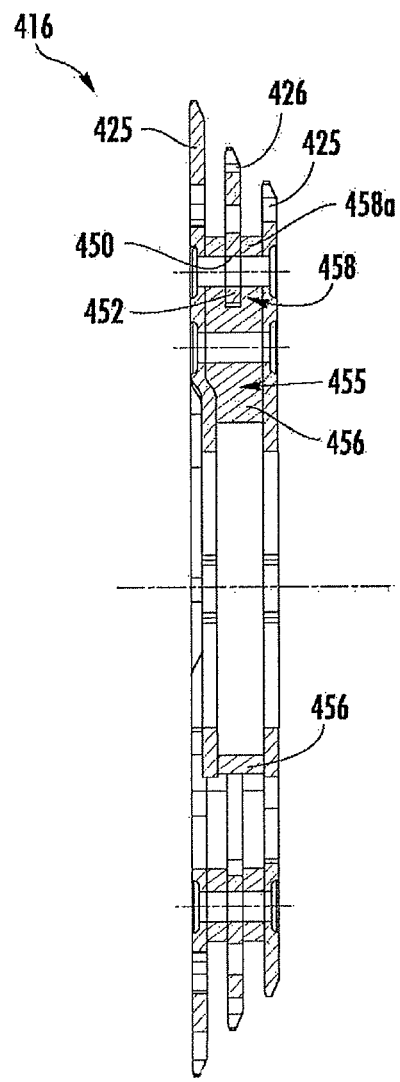
FIG. 15 schematically represents a diametric section view of the module of FIG. 14, taken according to the plane traced with the line XV-XV of FIG. 14.

FIGS. 14 and 15 illustrate a further module, indicated with 416 and similar to the module 316 of FIG. 13. In particular, FIG. 14 illustrates such a module 416 without the support sprocket with the smallest diameter and therefore such a FIG. 14 is totally analogous to the part of the module 316 illustrated in FIG. 13. It should be noted that the module 416 differs from the module 316 of FIG. 13 in that the structural spacer elements 358 and the radially most inner spacer element 356 are fused into a single spacer element 455. In particular, the spacer element 455 has a radially inner annular portion 456, for example cylindrical, of a size such as to entirely occupy the space between the two support sprockets 425, and a forked portion 458 that projects radially outwards from the radially inner annular portion 456 to be inserted between each support sprocket 425 and the intermediate sprocket 426. In particular, the forked portion 458 comprises a pair of substantially annular portions 458a, radially outer and facing one another in the axial direction, and a plurality of pairs of arms 458b facing one another in the axial direction and each extending between the radially inner annular portion 456 and the radially outer annular portion 458a. In the illustrated example, there are three pairs of arms 458b. The substantially annular portions 458a have a plurality of recesses 458c with respect to the circumference of maximum radial size, positioned and sized to allow the supported sprocket 426 to be housed through a bayonet movement, i.e. through insertion of the radial projections 452 of the sprocket 426 in the recesses 458c, and subsequent rotation into the operative position in which the holes 450 of the sprocket 426 are aligned in the axial direction with the holes 462 and 463 of the spacer element 455.

The spacer element 455 can in this case for example be made from light alloy or a composite material comprising structural fibers in a polymeric matrix. It is also provided to make the radially inner annular portion 456 from a light material resistant to compression and the structural forked portion 458 from a light material resistant to bending and twisting. For example it is possible to co-mold a cylindrical aluminum insert, which substantially constitutes the radially inner annular portion 456, in a mould in which a composite material is injected, which constitutes the forked portion 458.

Figure 16:
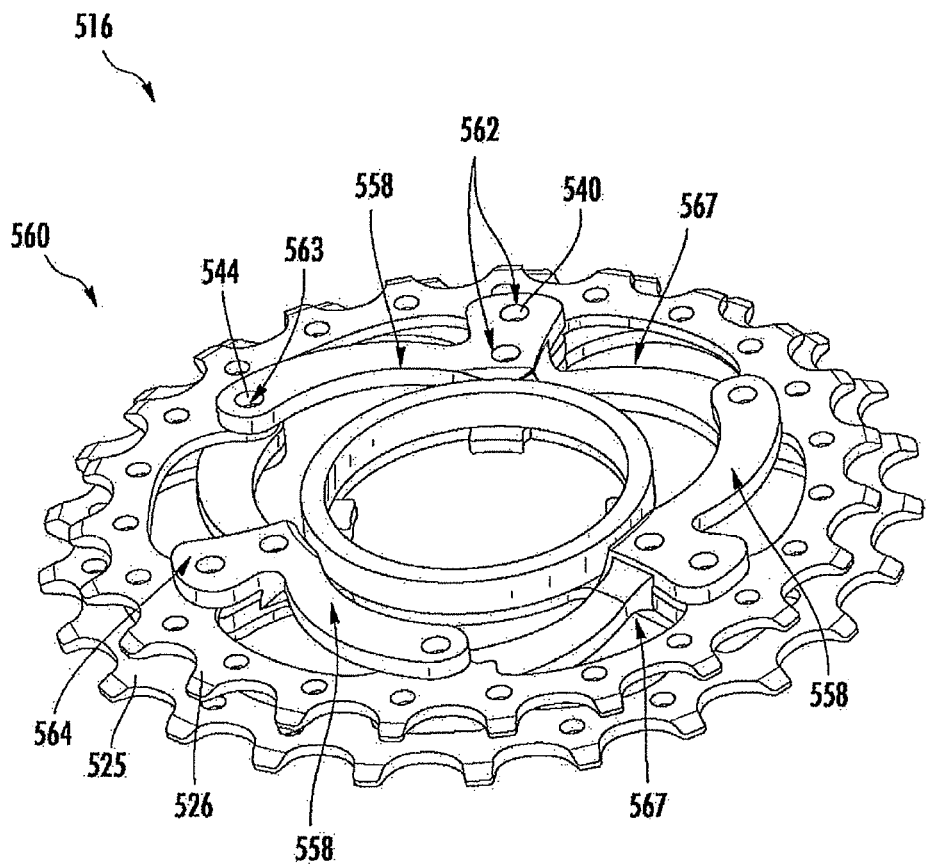
FIG. 16 schematically represents a perspective view of a further embodiment of a module in which the sprocket with the smallest diameter has been removed, in order to illustrate the parts hidden by it.
Figure 17:
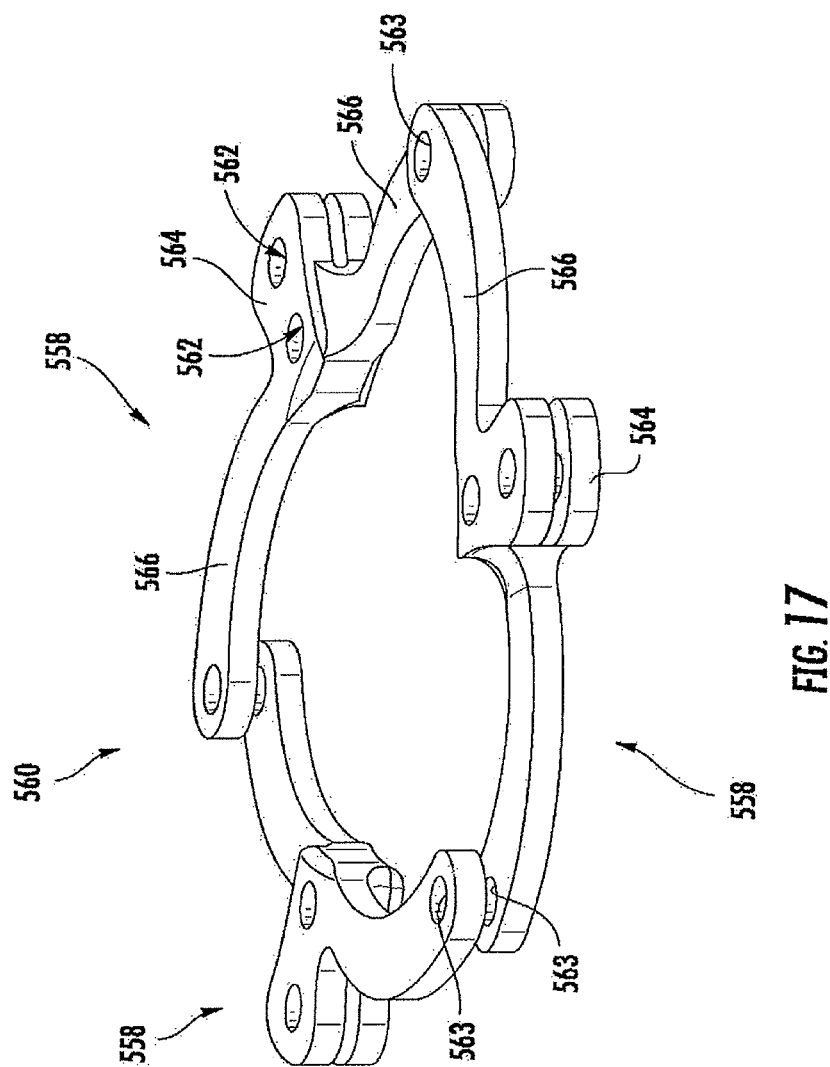
FIG. 17 schematically represents a perspective view of the spacer elements of the module of FIG. 16 in a relative configuration identical to that which they have inside the module of FIG. 16.

FIG. 16 illustrates a module 516 that differs from the module 116 of FIG. 11 in that the structural spacer elements 158 are replaced by a plurality of connection elements 558 associated with one another at the respective free end portions to form overall a substantially annular structure 560, as shown in FIG. 17. In particular, the connection elements 558 are associated with each other at the holes 563 through the rivets 544. Each bridge 558 comprises a central portion 564, prevalently elongated in the radial direction, so that the holes 562 for the rivets 540 can be made thereon. The central portion 564 is fork-shaped, so that it can be inserted between each support sprocket 525 (only one is illustrated in FIG. 16) and the intermediate sprocket 526.

From the elongated portion 564 two strengthening arms 566 circumferentially extend cantilevered at the ends of which holes 563 are made for the insertion of the rivets 544. The arms 566 extend on circumferential planes that are parallel but do not coincide. In mounted condition, one of the two arms 566 is inserted between a first support sprocket 525 and the central sprocket 526, whereas the other arm is inserted between the other support sprocket 525 and the central sprocket 526.

As is clear from FIG. 17, this embodiment, with respect to those with completely annular structural spacer elements, has the advantage of being lighter, since there are circumferential tracts in which there is a single strengthening arm 566.

Finally, it should be noted that the arms 566 extend from the elongated portion 564 starting from the radially most inner area thereof so that there remains a free area 567 between the arms 566 and the sprockets 525 and 526 to allow the passage of the mud and other impurities. The presence of a single arm 566 below these areas makes the passage even easier.

Figure 18:
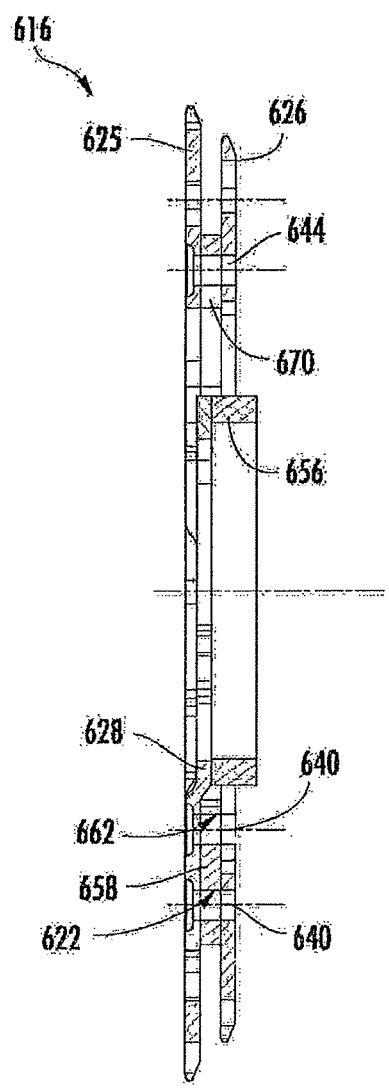
FIG. 18 schematically represents a diametric section view of an alternative embodiment of a module, in which a sprocket is supported cantilevered.

FIG. 18 illustrates a module 616 comprising just two sprockets. In particular, a first support sprocket 625 with an annular portion 628 for engagement with the freewheel body 3 supports cantilevered a second sprocket 626 through rivets 640 and additional rivets 644. Between the two sprockets there are respectively interposed an annular structural spacer element 658, comprising a pair of holes 662 for the rivets 640, and cylindrical spacer rings 670 around the additional rivets 644. Between two modules 616 mounted consecutively on a freewheel body 3 there can be interposed a cylindrical spacer element 656.

Figure 19:
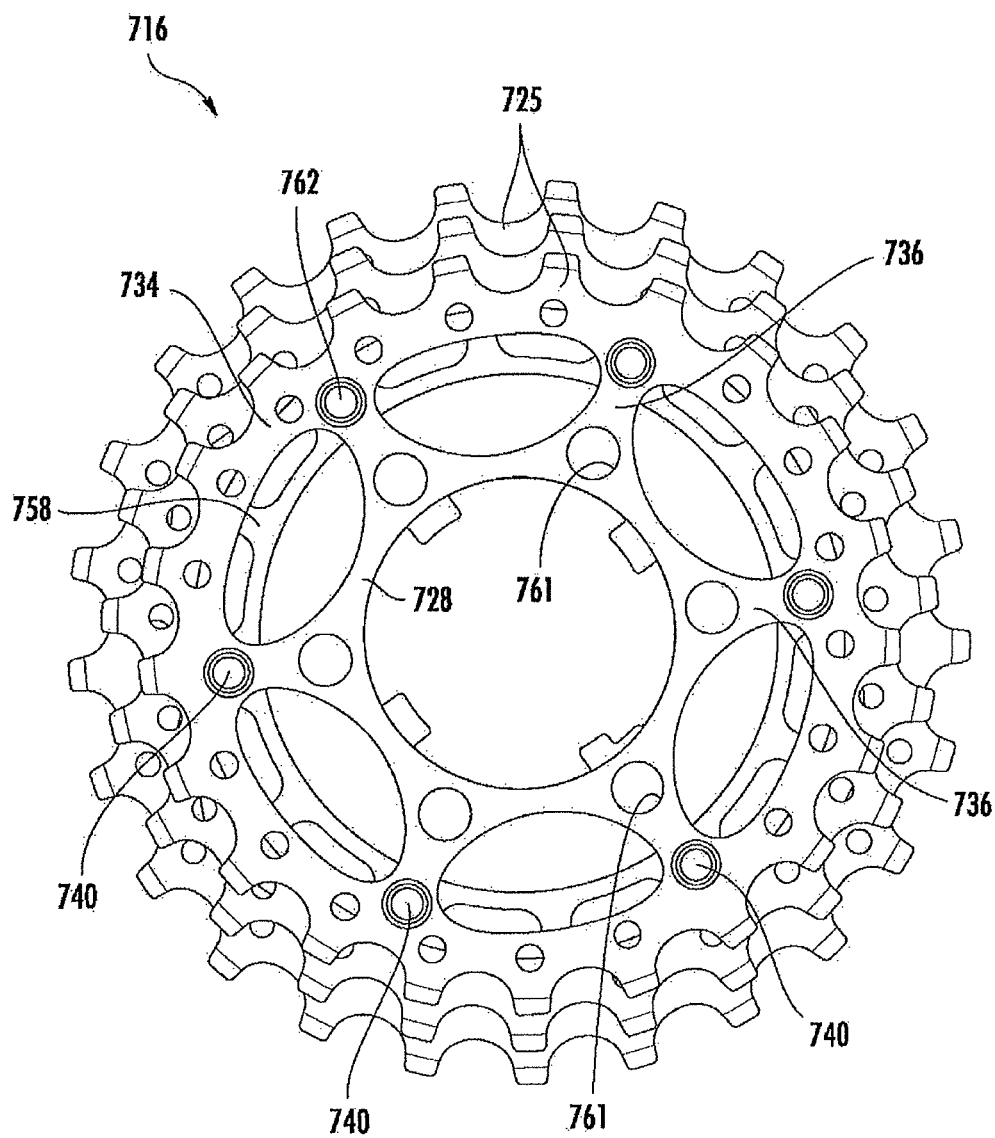
FIGS. 19 and 20 schematically represent front views of further embodiments of modules.

FIG. 19 illustrates a module 716 that differs from the module 16 of FIG. 2 in that each support sprocket 725 has six radial connecting arms 736 between the radially inner annular portion 728 and the toothed crown 734, instead of the three arms 36 of the sprockets 25 of FIG. 2. Each connecting arm 736 has a single hole 762 for the passage of a rivet 740. Therefore additional rivets outside of the connecting arms 736 are not necessary. Each arm 736 is triangular shaped with the base directed radially inwards. In order to make the arms lighter lightening holes 761, or openings with any type of shape, are provided below the holes 762. The structural spacer elements 758 are in this case simple rings without portions elongated in the radial direction, whereas between the engagement portions 728 there is provided a cylindrical spacer element as the spacer element 56 of FIG. 3.

Figure 20:
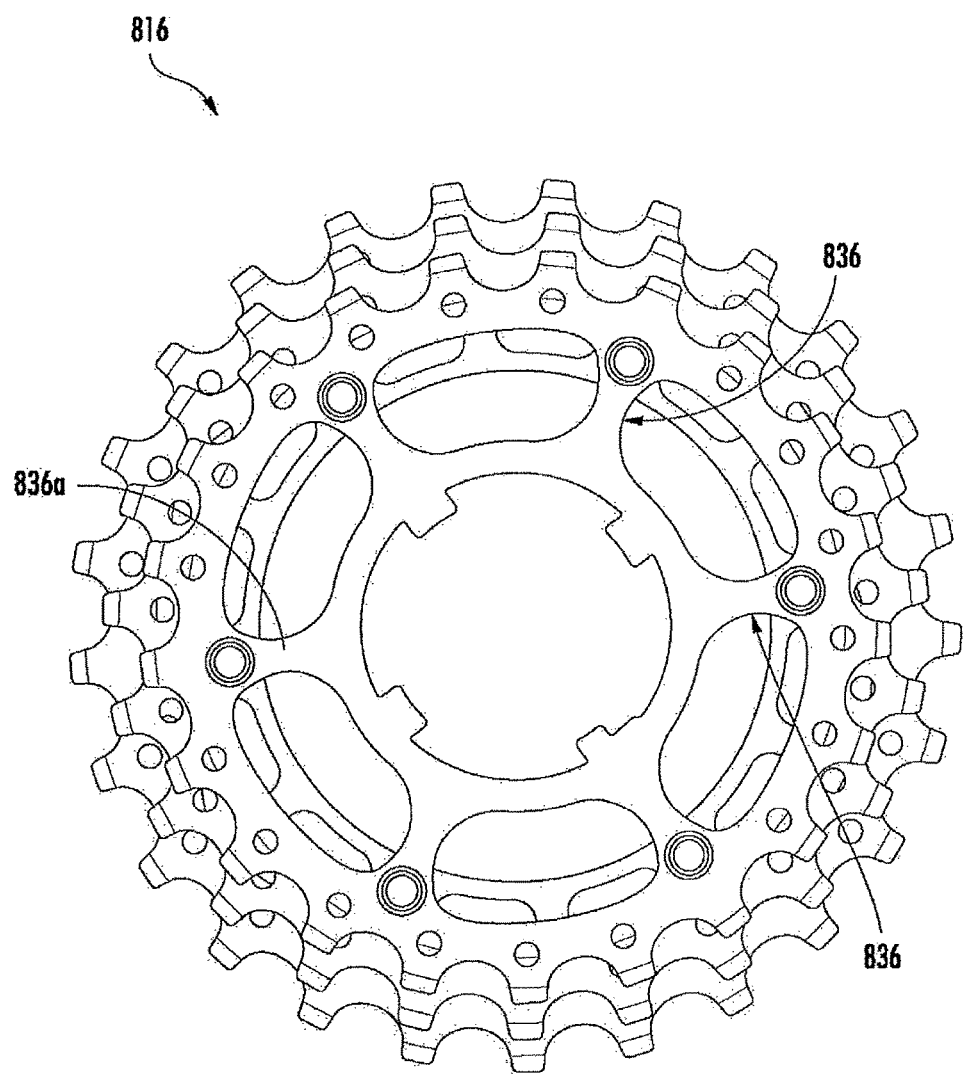

As an alternative to the lightening holes, FIG. 20 shows a module 816 in which the connecting arms 836 are made with a median portion 836a of limited size, for example substantially the same as, or even smaller than, the diameter of the holes 762.

The solutions with many arms like those of FIGS. 19 and 20 are heavier but more rigid compared to those with less arms like that of FIG. 2.

FIGS. 21, 22, and 22a-c show a variant of a cylindrical spacer element 956 that can be used as an alternative to the cylindrical spacer elements 56, 156, 256, 356, 456, 556, 656, 756, 856 of the previous embodiments. In particular, the cylindrical spacer element 956 has hooking teeth 955 to be hooked to one of the radially inner annular portions 28, 128, 228, 328, 428, 528, 628, 728, 828 of the previous embodiments. The engaging teeth 955 project cantilevered in the axial direction from flat annular walls 949, so as to prevent the relative movement in the radial direction of the spacer element 956 with respect to the engagement portions when the spacer element is mounted between two support sprockets.

There may be three of the engaging teeth 955. In this case, the teeth 955 are positioned angularly staggered apart one another by 120°.

FIGS. 23 and 24 show a further module 1016, in which two sprockets 1025 are provided coupled one another, both comprising an engagement portion 1028 with the freewheel body. The two sprockets 1025 are rigidly constrained through rivets 1040 and additional rivets 1044, which also hold a structural spacer element 1058 in a single piece. The spacer element rests upon the two faces, facing one another, of the sprockets 1025 for most of the height of the smallest sprocket 1025, in particular the resting height H is greater than half the height h (i.e. half the difference between outer diameter and inner diameter) of the smallest sprocket 1025, even more preferably it is greater than $\frac{2}{3}$ of h. An alternative relationship is given with respect to the outer radius R of the sprocket with the smallest diameter for which $H > \frac{1}{4}R$, or more preferably $H > \frac{1}{3}R$, or even more preferably $H > \frac{1}{2}R$.

Figure 25:
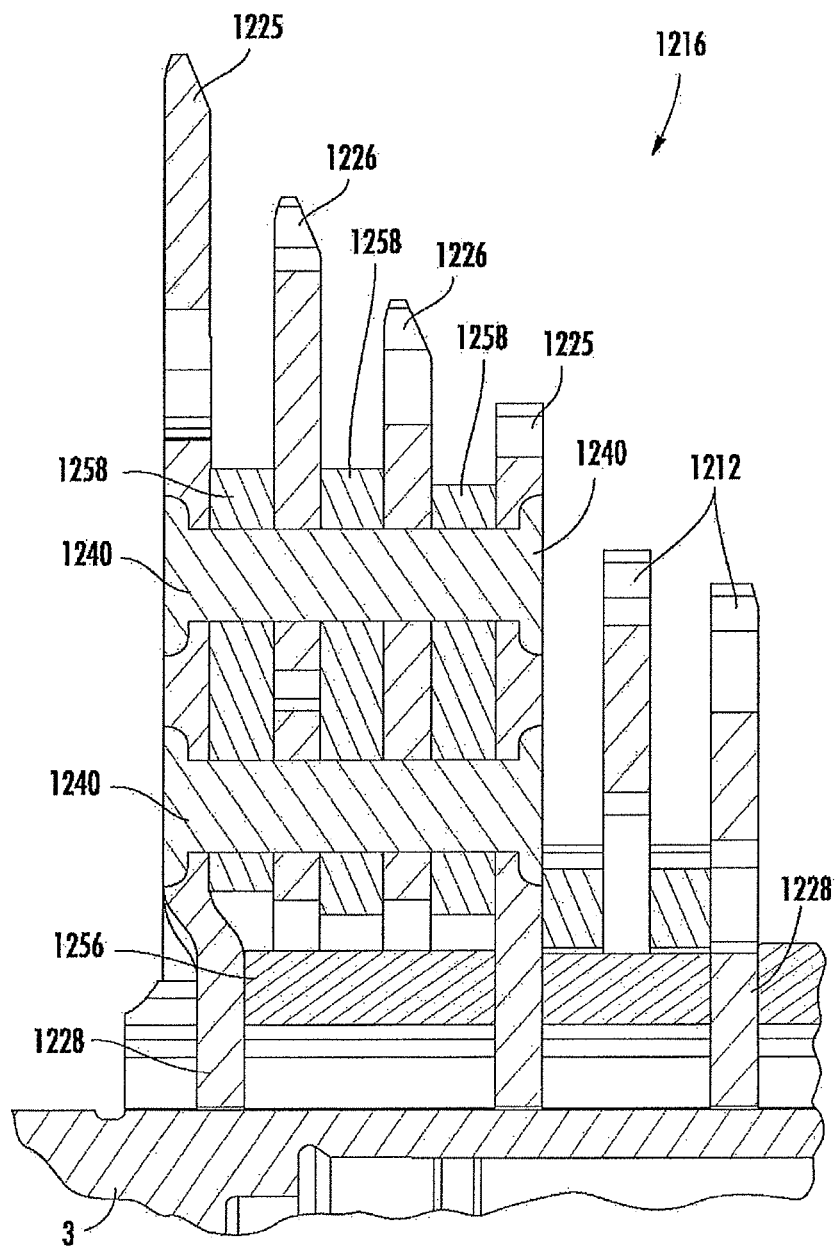
FIG. 25 schematically represents a diametric section of a further embodiment of a module, comprising four sprockets.

FIG. 25 shows a section view of a module 1216 comprising four sprockets, in particular two support sprockets 1225 arranged at the axial ends of the module 1216 and two central sprockets 1226 supported by the support sprockets 1225 through rivets 1240. Just the support sprockets 1225 comprise an engagement portion 1228 with a freewheel body 3 between which a cylindrical spacer element 1256 is interposed. Structural spacer elements 1258 are arranged between each pair of sprockets in a more radially outer position with respect to the cylindrical spacer elements 1256, and are constrained to the sprockets themselves through the rivets 1240.

The module 1216 is shown mounted on a freewheel body 3 in association with two free sprockets 1212.

The illustrated examples show just some of the possible configurations, for example the number of sprockets for each module can vary from a minimum of two up to comprising all of the sprockets of the sprocket assembly. However, modules with few sprockets can be quickly interchangeable with modules comprising sprockets with different sizes to provide sprocket assemblies meeting the requirements of each individual cyclist or of each individual route—larger numbers of sprockets make this quick-interchangeability more difficult. Moreover, the support sprockets are not necessarily the end ones, or all the end ones or only the end ones.

Because of the mutual support of the sprockets that are fixedly constrained one another as a single structural unit, the sprockets resist bending and twisting that in use, is stressed by a chain. Because they are a single unit, the thickness of the individual sprockets can be reduced thus being able to house even eleven or more sprockets on a freewheel body of standard type. For example, the thickness of the sprockets can be between 1 and 2 mm or even more preferably between 1.4 and 1.7 mm.

The increase in the structural strength of each individual sprocket through the effect of the nearby sprockets is also helped by the cylindrical spacer elements 56, 156, 256, 356, 456, 556, 656, 756, 856, 956 and structural spacer elements 58, 158, 258, 358, 458, 558, 658, 758, 858, 1058 that are interposed between the sprockets as spacing means capable of blocking the deformations due to bending of the sprocket engaged by the chain, splitting them also over the neighboring sprockets.

Moreover, the structural spacer elements 58, 158, 258, 358, 458, 558, 658, 758, 858, 1058, being rigidly constrained to the sprocket, in proximity to the toothed crown, already by themselves reinforce the sprocket against deformations due to bending and twisting.

Of course, a person of ordinary skill in the art can bring numerous modifications and variants to the sprocket module for a bicycle described above, in order to satisfy contingent and specific requirements, all of which are anyway covered by the scope of protection as defined by the following claims.

What is claimed is:

1. Sprocket module for a bicycle, comprising:
    at least two sprockets, and
    at least one spacer that is an annular body having planar axial faces contacting the at least two sprockets, the annular body and the planar axial faces are configured to extend circumferentially around a freewheel body of a hub for a bicycle rear wheel, and the annular body includes a plurality of fastening holes for coupling the at least one spacer with the at least two sprockets;

wherein the at least two sprockets are fixed to each other;
at least one first sprocket of the at least two sprockets comprises an engagement portion configured to engage the freewheel body of the hub for the bicycle rear wheel; and
the at least one spacer is radially separated from the freewheel body.

2. Sprocket module according to claim 1,
wherein the at least one first sprocket comprises a radially inner annular portion provided with the engagement portion, a radially outer annular portion, concentric to the radially inner annular portion, provided with a toothing for engaging with a bicycle chain, and a plurality of radial portions extending between the radially inner annular portion, and the radially outer annular portion,
wherein the at least one spacer is in abutment with the at least one first sprocket at the radially inner annular portion and the plurality of radial portions.

3. Sprocket module according to claim 2, wherein the at least one first sprocket comprises a radially inner annular portion provided with the engagement portion,
wherein the at least one spacer includes a first spacer element and a second spacer element, the first spacer element is in abutment with the at least one first sprocket at the radially inner annular portion and the second spacer element is in abutment with the at least one first sprocket at the plurality of radial portions.

4. Sprocket module according to claim 3,
wherein at least one second sprocket of the at least two sprockets lacks an engagement portion configured to engage the freewheel body and is supported by the at least one first sprocket,
wherein the second spacer element is in abutment with the at least one first sprocket at first holes of the at least one first sprocket,
wherein the at least one second sprocket comprises a substantially annular body provided with an outer toothing and with a plurality of second holes adapted to receive first fixing elements for the coupling of the at least one second sprocket with the at least one first sprocket,
wherein the second spacer element is in abutment with the at least one second sprocket at the second holes.

5. Sprocket module according to claim 4,
wherein the at least one first sprocket comprises, in the radially outer annular portion and between two consecutive radial portions, at least one additional first hole adapted to receive an additional fixing element for the coupling of the at least one first sprocket with another sprocket of the module,
wherein the second spacer element is in abutment with the at least one first sprocket at the at least one additional first hole.

6. Sprocket module according to claim 4,
wherein the second spacer element comprises a substantially annular body having a plurality of portions elongated in a radial direction and connected by respective bridge portions, wherein each portion elongated in the radial direction comprises at least one third hole axially aligned with one of the first holes and with at least one second hole of the plurality of second holes.

7. Sprocket module according to claim 6, wherein the at least one third hole of each one of the plurality of portions elongated in the radial direction includes two third holes, and each bridge portion comprises at least one additional third hole axially aligned with a respective additional first hole and with at least one respective second hole.

8. Sprocket module according to claim 7,
wherein the first holes are aligned along the radial direction and comprise a first radially inner hole and a first radially outer hole,
wherein the two third holes are aligned along the radial direction and comprise a radially inner third hole axially aligned with a respective radially inner first hole and a radially outer third hole aligned with a respective radially outer first hole.

9. Sprocket module according to claim 6, wherein the bridge portions circumferentially extend between two portions elongated in the radial direction of the plurality of portions elongated in the radial direction and are associated with a median area of the portions elongated in the radial direction.

10. Sprocket module according to claim 2,
wherein the at least one spacer includes a first spacer element and two second spacer elements,
wherein at least one second sprocket of the at least two sprockets is radially separated from the freewheel body and is supported by the at least one first sprocket,
wherein the at least one second sprocket comprises a substantially annular body provided with an outer toothing and with a plurality of second holes adapted to receive first fixing elements for the coupling of the at least one second sprocket with the at least one first sprocket,
wherein the two second spacer elements are in abutment with the at least one second sprocket at the second holes,
wherein the first holes of the at least one first sprocket are aligned along a radial direction, and the first holes comprise a first radially inner hole and a first radially outer hole.

11. Sprocket module according to claim 1,
wherein at least one second sprocket comprises a plurality of radial projections extending cantilevered in a radially inner direction from a substantially annular body,
wherein the at least one spacer is in abutment with the at least one second sprocket at the radial projections.

12. Sprocket module according to claim 1, wherein the at least one spacer is made from a first material, the at last two sprockets are made from a second material, and the first material is lighter than the second material.

13. Sprocket module according to claim 12, wherein the at least one spacer is made from a polymeric or reinforced plastic material.

14. Sprocket module according to claim 12, wherein the at least one first sprocket comprises a radially inner annular portion provided with the engagement portion, a radially outer annular portion, concentric to the radially inner annular portion, provided with a toothing for engaging with a bicycle chain, and a plurality of radial portions extending between the radially inner annular portion and the radially outer annular portion,
wherein the at least one spacer includes a first spacer element and a second spacer element, wherein the first spacer element is in abutment with the at least one first sprocket at the radially inner annular portion and the second spacer element, different from the first spacer element, in abutment with the at least one first sprocket at the radial portions, wherein the second spacer element is made from a metallic or composite material.

15. Sprocket module for a bicycle, comprising:
at least two sprockets, and at least one spacer consisting of an annular body having planar axial faces contacting the at least two sprockets, the annular body and the planar axial faces extend circumferentially around a freewheel body of a hub for a bicycle rear wheel, the annular body defining a plurality of fastening holes, and the at least one spacer is radially separated from the freewheel body;

wherein the at least two sprockets are fixed to each other and share a common driving engagement with the freewheel body.

16. Sprocket module for a bicycle, comprising:

at least two sprocket, and at least one spacer consisting of an annular body having planar axial faces contacting the at least two sprockets, the annular body and the planar axial faces are configured to extend circumferentially around a freewheel body of a hub for a bicycle rear wheel, the annular body defining a plurality of fastening holes, wherein at least two fastening holes of the plurality of fastening holes are aligned along a radial direction, the at least one spacer is radially separated from the freewheel body;

wherein the at least two sprockets are fixed to each other, wherein at least one first sprocket of the at least two sprockets comprises an engagement portion configured to engage with the freewheel body.

* * * * *